United States Patent
Griffith et al.

(10) Patent No.: US 10,657,008 B2
(45) Date of Patent: *May 19, 2020

(54) MANAGING A REDUNDANT COMPUTERIZED DATABASE USING A REPLICATED DATABASE CACHE

(71) Applicant: International Business Machines Corporation, Armonk, NY (US)

(72) Inventors: Douglas Griffith, Georgetown, TX (US); Anil Kalavakolanu, Austin, TX (US); Minh Q. Pham, Austin, TX (US); Isac Rodrigues Da Silva, Leander, TX (US); Stephen A. Schlachter, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 261 days.

This patent is subject to a terminal disclaimer.

(21) Appl. No.: 15/797,158

(22) Filed: Oct. 30, 2017

(65) Prior Publication Data

US 2018/0046554 A1   Feb. 15, 2018

Related U.S. Application Data

(63) Continuation of application No. 15/175,956, filed on Jun. 7, 2016, now Pat. No. 10,372,559.

(51) Int. Cl.
*G06F 16/00* (2019.01)
*G06F 11/14* (2006.01)
(Continued)

(52) U.S. Cl.
CPC ...... *G06F 11/1471* (2013.01); *G06F 16/2358* (2019.01); *G06F 16/273* (2019.01); *G06F 11/1458* (2013.01)

(58) Field of Classification Search
CPC ............. G06F 11/1471; G06F 16/2358; G06F 11/1458; G06F 16/273
See application file for complete search history.

(56) References Cited

U.S. PATENT DOCUMENTS 9,251,003 B1 * 2/2016 Gupta ................. G06F 11/1469
2011/0071981 A1   3/2011 Ghosh et al.
(Continued)

OTHER PUBLICATIONS

Elhardt et al., "A Database Cache for High Performance and Fast Restart in Database Systems", ACM Transactions on Database Systems, vol. 9, No. 4, pp. 503-525 (Dec. 1984).
Anonymous, "System and method for in-memory high availability/disaster recover solution", http://ip.com/IPCOM/000228771, Jul. 4, 2013.
(Continued)

*Primary Examiner* — Alexander Khong
(74) *Attorney, Agent, or Firm* — Roy W. Truelson

(57) ABSTRACT

Data in a database cache in memory of an operating database server is copied to memory of a standby database server, without requiring synchronization between the operating server and the standby server. If the operating server fails, the database is recovered to a consistent state in the standby server using a sequential database log and the copied data in the cache of the standby server. Preferably, recovery is performed by reading the log to determine a set of database actions to recover, verifying blocks of data in the standby server's cache, using verified blocks to recover at least some actions, and reading blocks from storage only when a corresponding verified block is not available in the cache.

17 Claims, 15 Drawing Sheets

(51) Int. Cl.
    *G06F 16/23*     (2019.01)
    *G06F 16/27*     (2019.01)

(56) References Cited

U.S. PATENT DOCUMENTS

| | | | |
|---|---|---|---|
| 2012/0310878 | A1 | 12/2012 | Vuksan et al. |
| 2013/0046731 | A1 | 2/2013 | Ghosh et al. |
| 2013/0086330 | A1 | 4/2013 | Baddepudi et al. |
| 2014/0188795 | A1 | 7/2014 | Alewine et al. |
| 2015/0200818 | A1 | 7/2015 | Winkelstrater |
| 2015/0347250 | A1* | 12/2015 | Kim .................. G06F 11/1658 714/4.11 |
| 2016/0179867 | A1* | 6/2016 | Li ..................... G06F 11/1435 707/634 |

OTHER PUBLICATIONS

Anonymous, "Method and Apparatus for Implementing In-memory Database Logging System"; http://ip.com/IPCOM/000200489, Oct. 15, 2010.

Anonymous, "Method for Read Ahead of Source Data Pages on Log Replicating Secondary Database Server"; http://ip.com/IPCOM/000196841, Jun. 18, 2010.

Yu, We, "In-memory Computing—Evolution, Opportunity and Risk", ISACA Journal, vol. 5, pp. 35-39, 2013.

Anonymous, "Algorithms for Recovery and Isolation Exploiting Semantics", Wikipedia entry published at https://en.wikipedia.org/w/index.php?title=Algorithms_for_Recovery_andIisolation_Exlpoiting_Semantics&oldid=716252077, Apr. 20, 2016.

Anonymous, "Transaction Log", Wikipedia entry published at https://en.wikipedia.org/w/index.php?title=Transaction_log&oldid=685340668, Oct. 12, 2015.

International Business Machines Corporation, "List of IBM Patents or Patent Applications Treated as Related", filed in USPTO in present application herewith.

* cited by examiner

MANAGING A REDUNDANT COMPUTERIZED DATABASE USING A REPLICATED DATABASE CACHE

CROSS-REFERENCE TO RELATED APPLICATION

This application is a continuation of copending U.S. patent application Ser. No. 15/175,956, filed Jun. 7, 2016, entitled "Managing a Redundant Computerized Database Using a Replicated Database Cache", which is herein incorporated by reference.

FIELD OF THE INVENTION

The present invention relates to digital data processing, and in particular to the management of redundant databases in a networked environment.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Modern computer systems may be used to support a variety of applications, but one common use is the maintenance of large relational databases, from which information may be obtained. A large relational database is often accessible to multiple users via a network, any one of whom may query the database for information and/or update data in the database.

Conceptually, a relational database may be viewed as one or more tables of information, each table having a large number of entries or records, also called "tuples" (analogous to rows of a table), each entry having multiple respective data fields (analogous to columns of the table) with a defined meaning. To access information, a query is run against the database to find all rows for which the data in the columns of the row matches some set of parameters defined by the query. A query may be as simple as matching a single column field to a specified value, but is often far more complex, involving multiple field values and logical conditions. A query may also involve multiple tables (referred to as a "join" query), in which the query finds all sets of N rows, one row from each respective one of N tables joined by the query, where the data from the columns of the N rows matches some set of query parameters. Found records may be updated by altering the values of one or more fields, or records may be deleted or added.

To support database queries, large databases typically include a query engine which executes the queries according to some automatically selected search (execution) strategy, and may include one or more metadata structures which characterize the data in the database table(s). Examples of metadata structures are indexes, materialized query tables, and histograms, it being understood that these examples are not necessarily exhaustive. Metadata structures may be used by the database query engine to determine an optimal query strategy for executing a query against the database.

When a record in a database is updated, deleted or added, the corresponding database table is updated, and it may further be necessary to update one or more metadata structures to reflect the change being made to the underlying data. Large databases may be accessible by many users concurrently, each of whom may be making changes to the data. The burden of processing and recording these changes can be significant.

For performance reasons, large databases typically record changes in a sequential database log, also called a journal. A sequential log of transactions can be written to non-volatile storage, such as a hard disk drive, much more quickly than a corresponding set of transactions can be written to scattered individual non-volatile storage locations of the database table(s) and metadata. The log enables recovery of database data to reconstruct the database to a consistent state in the event of a system and/or network failure (either temporary or permanent) which causes loss or unavailability of volatile data. I.e., in the event of a system/network failure, even if some transactions have not been written to the database tables and other structures in non-volatile storage, it is possible to reconstruct the database state by parsing the transactions in the log and updating the data accordingly.

Although conventional database logs make it possible to reconstruct the database, they do not necessarily make it easy. The log is read back to a checkpoint, and entries in the log are redone (or in some cases, undone), by reading in affected pages of database tables and metadata, modifying the tables/metadata accordingly, and writing them out. Depending on the number of entries in the log and other factors, this can take considerable time, during which the database may be unavailable to users who wish to access it.

A need exists for improved techniques for managing relational databases, and in particular, for improved techniques which reduce unavailability of a database and/or resources required to reconstruct the database in the event of a system/network failure.

SUMMARY

Data in a database cache in memory of an operating database server is copied to memory of a standby back-up database server as changes are made to the cache, without requiring synchronization between the operating database server and the standby server. In the event of failure of the operating database server, the database is recovered to a consistent state in the back-up server using a sequential database log and the copied data in the database cache of the back-up server. Preferably, recovery is performed by reading the database log to determine a set of database actions to recover, verifying blocks of data in the database cache in memory of the back-up server, using verified blocks to recover at least some of the actions to be recovered, and reading blocks from storage to recover an action only when a corresponding verified block is not available in the database cache.

In one or more preferred embodiments, a primary database server and a secondary (backup) database server are different nodes of a cluster which share a common database storage. These nodes may be implemented as respective logical partitions of respective computer systems coupled by one or more networks. The primary database server accesses the database in the common database storage on behalf of multiple clients, while the secondary is in standby mode. In performing accesses to the database, the primary database server accumulates multiple blocks of database data in a database cache in its memory, and performs update operations on these blocks in the cache before they are written out to the common database storage. Database operations performed by the primary database server are also written to a sequential database log in storage, from which it is logically possible to recover database state after an arbitrary loss of data in the primary server by traversing the log sufficiently far backwards. During operation in the primary server, a low-level function in the code which enforces logical partitioning (or in the operating system) copies data in the primary's database cache to corresponding addresses in allocated cache space in the secondary server. This data is simply copied from one location to another, without synchronization with database operations. In the event of failure of the primary database server, database state is recovered in the secondary. Since the state of the secondary's database cache is not initially known or necessarily synchronized with the primary's database cache immediately before failure, each block in the secondary's cache is independently verified during recovery. Blocks which can not be verified are read in from storage during recovery and/or recovered from the log.

By copying data to a cache in memory in the standby system, the number of accesses to storage during recovery can be substantially reduced, thereby significantly reducing average time to recover in the event of a failure. Furthermore, since data is simply copied by a low level function without synchronization with other database operations, very little additional operational overhead is imposed on the primary database server system.

The details of the present invention, both as to its structure and operation, can best be understood in reference to the accompanying drawings, in which like reference numerals refer to like parts, and in which:

DETAILED DESCRIPTION

Cluster Overview

Figure 1:
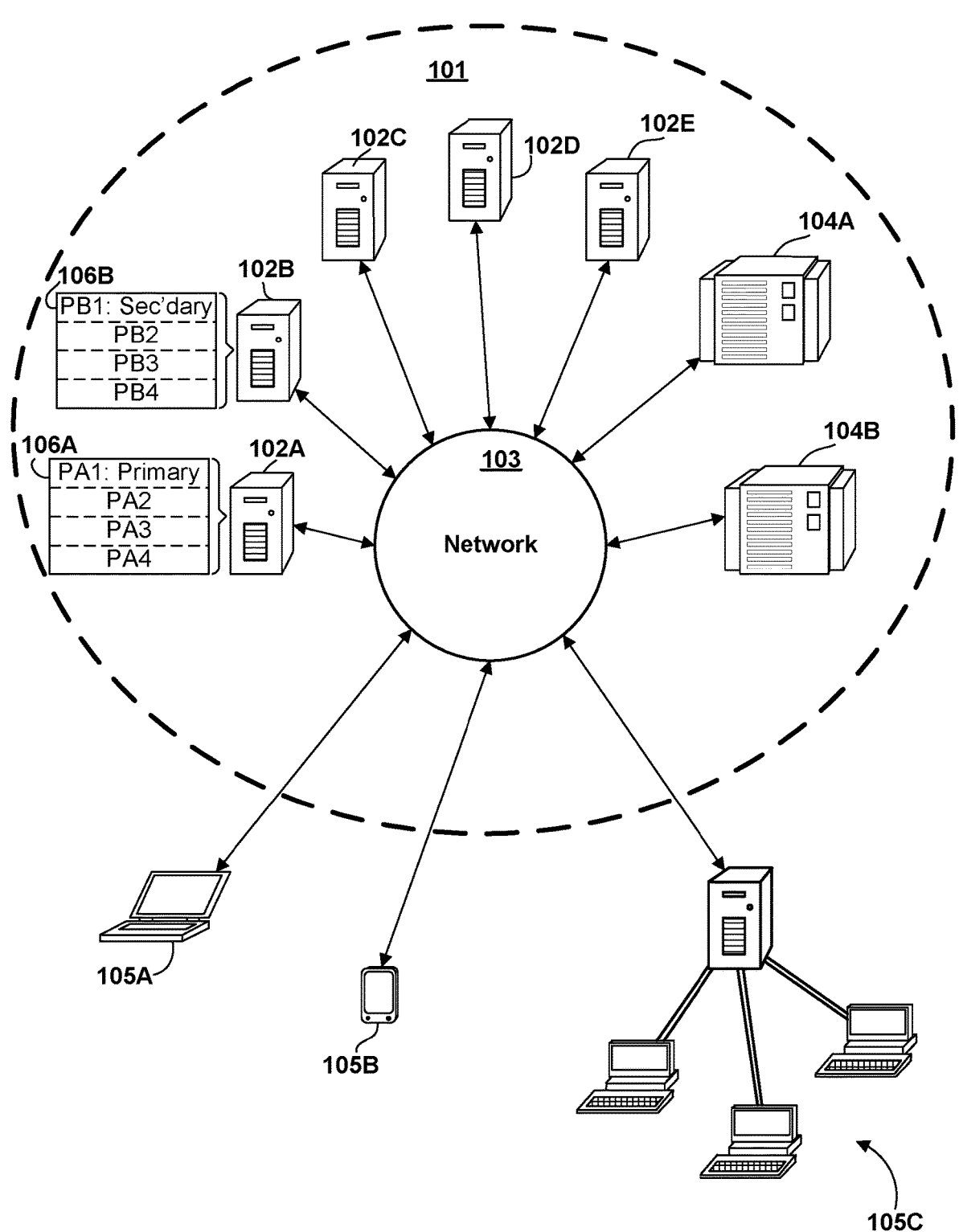
FIG. 1 is a high-level illustration of the representative major physical components which implement a computer system cluster for maintaining a shared database, in accordance with one or more preferred and/or alternative embodiments of the present invention.

Referring to the Drawing, wherein like numbers denote like parts throughout the several views, FIG. 1 is a high-level illustration of the representative major physical components which implement a computer system cluster 101 for maintaining a shared database, in accordance with one or more preferred and/or alternative embodiments of the present invention. As shown in FIG. 1, the cluster 101 is implemented as a collection of physical computing devices referred to as server computer systems 102A-E (herein generically referred to as feature 102) coupled to at least one network 103 (which may in fact be embodied as a collection of networks capable of communicating data among themselves). Server computer systems 102 are preferably general purpose digital computer systems acting as servers, each having a respective at least one programmable central processing unit (CPU) which executes instructions storable in an addressable memory, although they could be any digital data computing device which can be coupled to a network. Preferably, each physical server computer system 102 may be logically partitioned into a plurality of partitions 106A, 106B (herein generically referred to as feature 106), each partition functioning as a respective server node of cluster 101. Alternatively a physical server computer system 102 may be unpartitioned and function as only a single server node. The cluster 101 further includes one or more shared data storage servers 104A-B (herein generically referred to as feature 104) coupled to network 103, and providing access to a shared database for use by the multiple server computer systems 102. Each data storage server 104 may include multiple individual data storage devices configured to provide some level of redundancy, as is known in any of various Redundant Arrays of Independent Disks (RAID) technologies or other redundant technology. The cluster 101 may further include additional devices (not shown), such as routers, shared I/O devices, special purpose digital devices for performing accounting, maintenance, backup, and other functions, and/or other devices.

In one or more preferred embodiments, one of the partitions (server nodes) 106A is designated the primary database server node for serving a particular database, and another partition 106B, preferably in a separate physical server 102, is designated the secondary database server node for serving that same database, the function of which is explained in greater detail herein.

Multiple client devices 105A-C (herein generically referred to as feature 105) access respective computing services in cluster 101. A client could be any digital data device capable of communicating with the cluster over a network. For example, FIG. 1 represents a laptop computer system 105A, a handheld portable device 105B such as a personal digital assistant, smartphone, or the like, and a multi-user computer system 105C having multiple terminals attached thereto. However, it will be understood that these examples are not exhaustive, and any of various alternative digital data devices could be used, that such devices might be single user or multiple user, might be general-purpose programmable digital computers or special purpose digital devices, could have fixed location or movable location (including vehicular mounted devices), and so forth.

From the perspective of the client, each client device 105A, 105B, 105C obtains computing services from the cluster 101 as a single entity. I.e, the cluster appears to the client as a single computer system having certain hardware and software resources which performs computing services on behalf of the client. The client requests a computing service from the cluster without knowing the particular configuration of server computer systems 102 and data storage servers 104 within cluster 101, and without requesting that any particular server node within the cluster perform the service. The cluster determines which node or nodes will perform a particular request, and performs the request accordingly.

In one or more embodiments, network 103 is or includes the Internet, and may further include other networks, such as one or more local area networks, which are coupled to the Internet and capable of communicating therewith, as is well known in the art. Additionally, in an embodiment, may include one or more virtual networks (VLANs). In particular, a client 105 may access computing resources in the networked environment via the Internet, although the various server computer systems 102 and/or data storage servers 104 in the cluster may be configured as one or more local area networks or VLANs in communication with the Internet. However, a networked computing environment would not necessarily have to include the Internet, and might include some other network or networks, such as an internal network of a large business entity.

Although FIG. 1 represents in simplified form a particular number of server computer systems 102, data storage servers 104, and clients 105, it will be appreciated that the number of such devices could vary and is typically larger. It will further be understood that, although various devices may appear identical for representational purposes in the figures, they do not necessarily have identical attributes. It will be further understood that the topology of network 103 is represented in simplified form in FIG. 1 for clarity of illustration, and that the actual topology of network communications may be far more complex, and may involve redundant networks and links, hierarchical network connections and/or any of various network configurations, as is known in the art.

Although one or more embodiments are described herein as implemented using a cluster, the present invention is not necessarily limited to implementation in cluster networks, and could be implemented using any of various digital data devices in communication with one another over one or more networks.

Computer System Hardware Components

Figure 2:
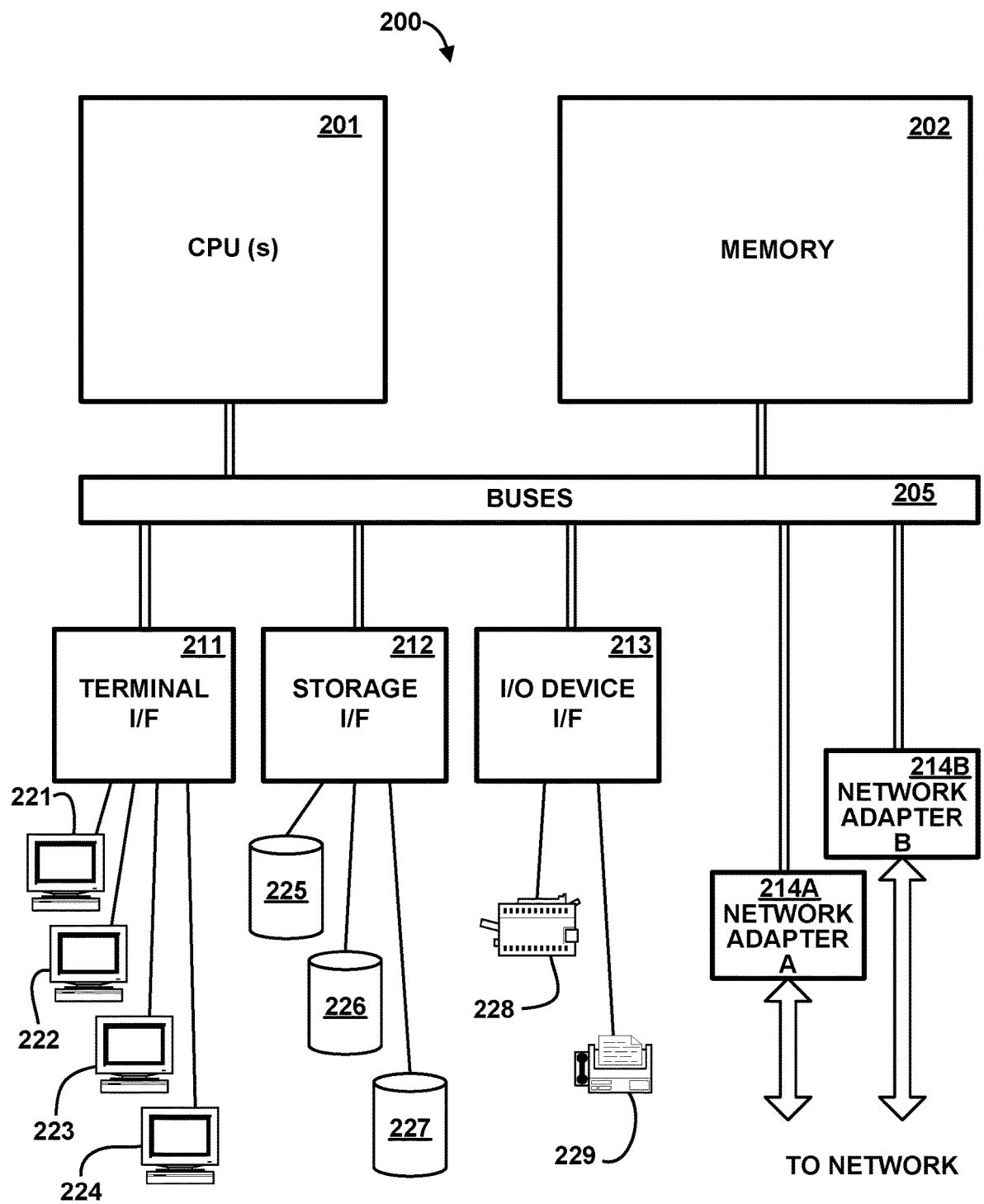
FIG. 2 is a high-level block diagram of the major hardware components of a representative general purpose computer system which could be used to perform the role of any of several functional elements, according to one or more preferred and/or alternative embodiments

FIG. 2 is a high-level block diagram of the major hardware components of a representative general purpose computer system 200. In one or more embodiments, server computer system systems 102 are physically embodied as respective one or more general purpose computer systems, system 200 being a representation of any such general purpose computer system. A client 105 and/or a storage server 104 may also be embodied as a general purpose computer system.

Computer system 200 includes at least one general-purpose programmable processor (CPU) 201 which executes instructions and processes data from main memory 202. Main memory 202 is preferably a volatile random access memory comprising at least one, and typically multiple, semiconductor integrated circuit chip modules, using any of various memory technologies, in which data is loaded from storage or otherwise for processing by CPU 201.

One or more communications buses 205 provide a data communication path for transferring data among CPU 201, main memory 202 and various I/O interface units 211, 212, 213, 214A, 214B, which may also be known as I/O processors (IOPs) or I/O adapters (IOAs). The I/O interface units support communication with a variety of storage and I/O devices. For example, terminal interface unit 211 supports the attachment of one or more user terminals 221-224. Storage interface unit 212 supports the attachment of one or more direct access storage devices (DASD) 225-227 (which are typically rotating magnetic disk drive storage devices, although they could alternatively be other devices, including arrays of disk drives configured to appear as a single large storage device to a host). I/O device interface unit 213 supports the attachment of any of various other types of I/O devices, such as printer 228 and fax machine 229, it being understood that other or additional types of I/O devices could be used. Network interface adapters 214A, 214B (herein generically referred to as feature 214) support connections to one or more external networks for communication with one or more other digital devices, and specifically to network 103 for communication with devices represented in FIG. 1. Network adapters 214 could support redundant connections to a single network, or could be coupled to separate networks, which may or may not be in communication with each other. While two network adapters 214 and network connections are shown, there may be only a single adapter and connection, or there could be more than two. Such external networks preferably include the Internet, and may include one or more intermediate networks, such as local area networks, through which communication with the Internet is effected.

It should be understood that FIG. 2 is intended to depict the representative major components of general purpose computer system 200 at a high level, that individual components may have greater complexity than represented in FIG. 2, that components other than or in addition to those shown in FIG. 2 may be present, that the number, type and configuration of such components may vary, and that a complex computer system will typically have more components than represented in FIG. 2. Several particular examples of such additional complexity or additional variations are disclosed herein, it being understood that these are by way of example only and are not necessarily the only such variations.

Although only a single CPU 201 is shown for illustrative purposes in FIG. 2, computer system 200 may contain multiple CPUs, as is known in the art. Although main memory 202 is shown in FIG. 2 as a single monolithic entity, memory 202 may in fact be distributed and/or hierarchical, as is known in the art. For example, memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures Although communications buses 205 are shown in FIG. 2 as a single entity, in fact communications among various system components is typically accomplished through a complex hierarchy of buses, interfaces, and so forth, in which higher-speed paths are used for communications between CPU 201 and memory 202, and lower speed paths are used for communications with I/O interface units 211-214. Buses 205 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 205 from various communications paths running to the various I/O devices, it would alternatively be possible to connect some or all of the I/O devices directly to one or more system buses. Although FIG. 1 represents network 103 as a single entity, in one or more embodiments a separate network or storage bus may be present for communicating with one or more shared storage servers 104, and such communication may be driven by a dedicated one or more storage interface units 212 separate from general purpose network adapters 214.

Computer system 200 depicted in FIG. 2 has multiple attached terminals 221-224, such as might be typical of a multi-user "mainframe" computer system. Typically, in such a case the actual number of attached devices is greater than those shown in FIG. 2, although the present invention is not limited to systems of any particular size. Where computer system 200 is used exclusively as a one or more server nodes of cluster 101 for performing work on behalf of remote clients 105, it may contain only a limited number of terminals, or even a single terminal, e.g., for use as a maintenance interface by a system administrator or the like, or in some cases no terminal at all, administrative functions being performed remotely. Furthermore, while certain functions are described herein for illustrative purposes as embodied in a single computer system, some or all of these functions could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention.

Database Components

Figure 3:
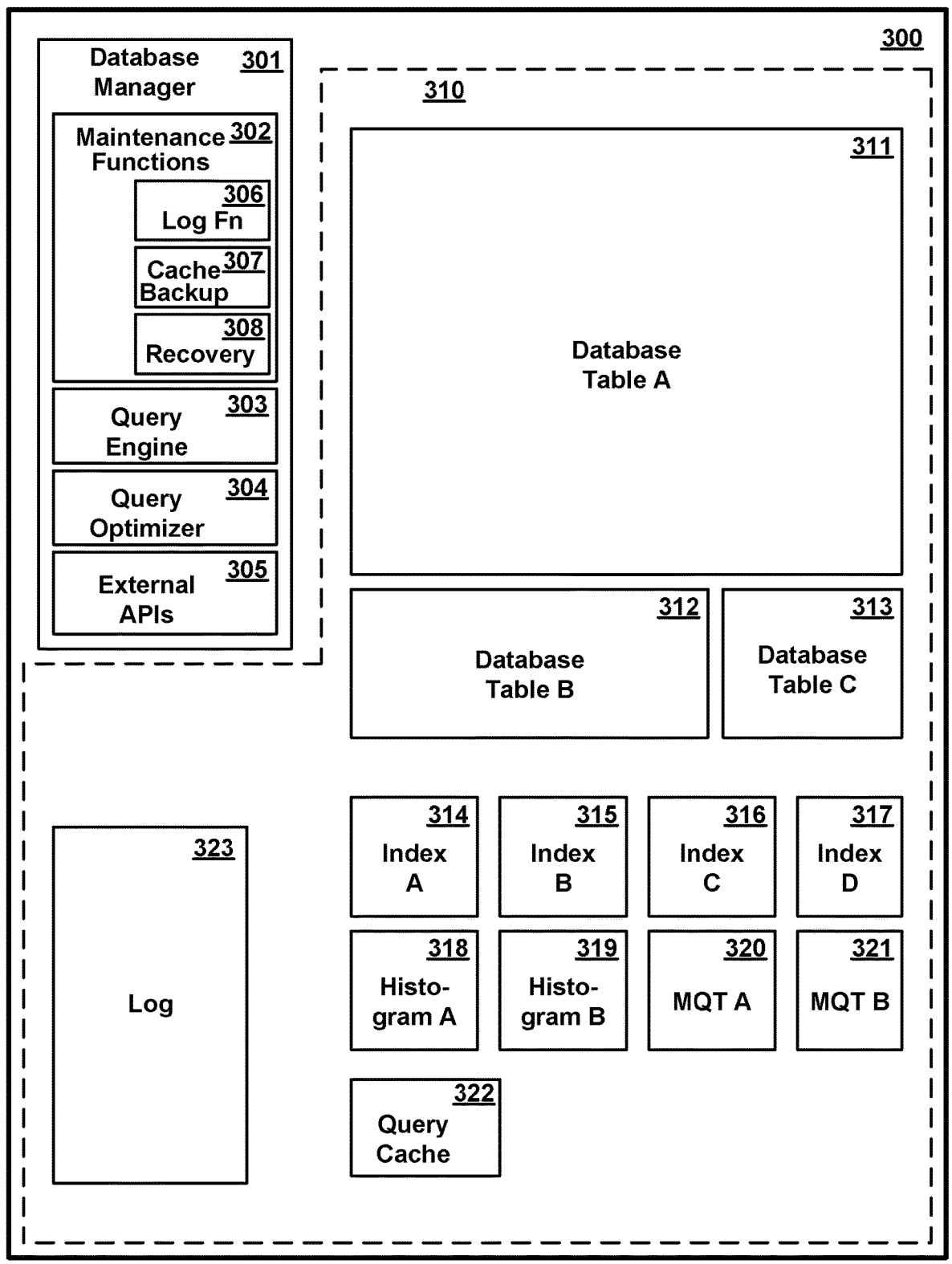
FIG. 3 is a conceptual illustration of the major software components of a structured relational database, according to one or more preferred and/or alternative embodiments.

FIG. 3 is a conceptual illustration of the major software components of a structured relational database 300, according to one or more preferred and/or optional embodiments. Structured relational database 300 includes database management software 301 for managing the database data, and database tables and metadata 310. In general, the entire database is stored on one or more shared storage servers 104, and may be stored redundantly. Typically, computer system memory 202 of a server system 102 is too small to hold the entire database, and portions of the data and database management software are loaded into memory as required.

Database tables and metadata 310 include one or more tables 311-313 (of which three are shown for illustrative purposes in FIG. 3, it being understood that the number may vary). As is known in the database art, a database table is a data structure logically in the form of a table having multiple records (also called entries or tuples), each record having at least one, and usually multiple, fields (also called attributes). The "rows" of the table correspond to the records, and the "columns" correspond to the fields. Although tables 311-313 are data structures which are logically equivalent to tables, they may be arranged in any suitable structure known in the database art. Database tables 311-313 might contain almost any type of data which is useful to users of a computer system.

Figure 4:
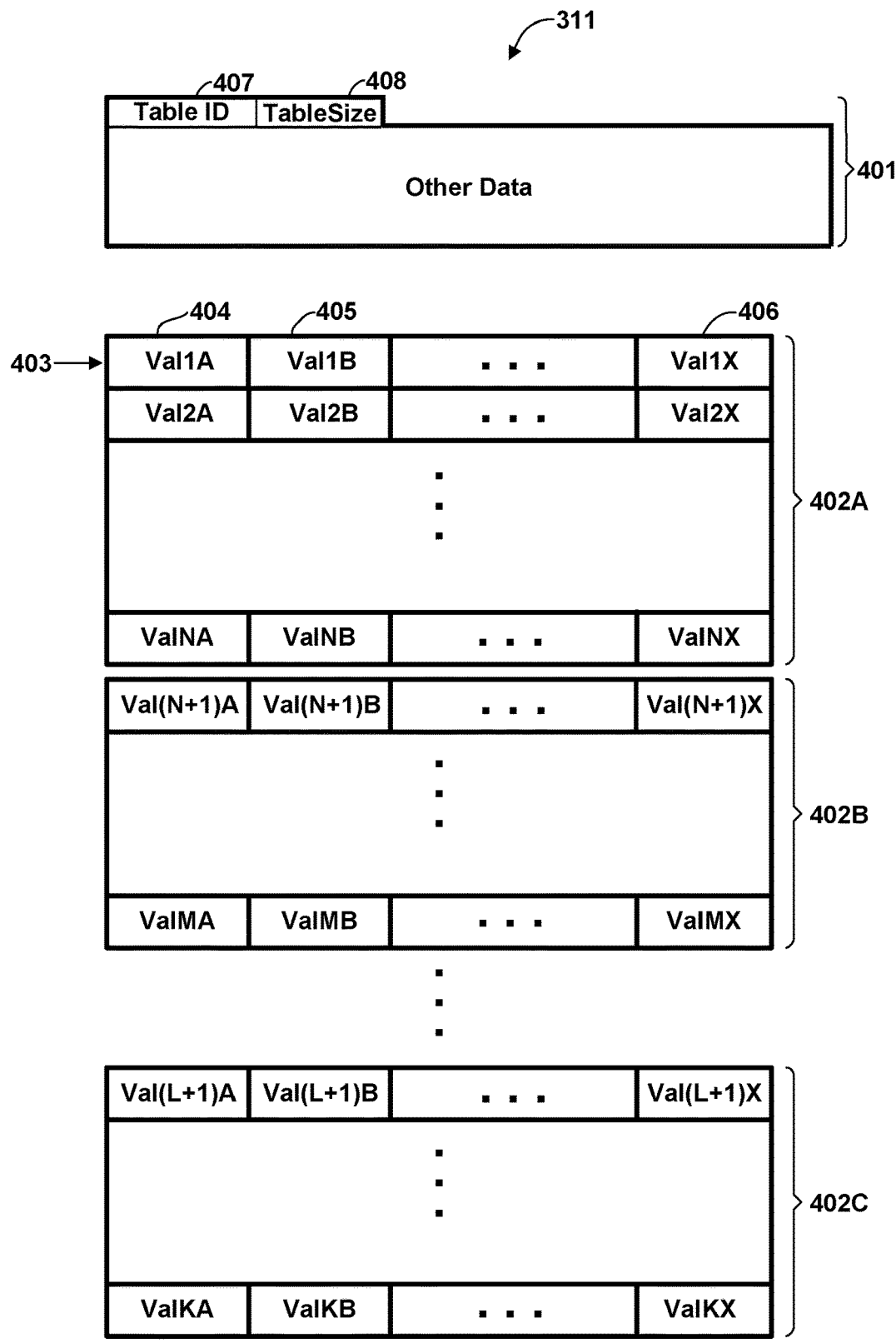
FIG. 4 is a conceptual representation of the structure of a database table, according to one or more preferred and/or alternative embodiments.

FIG. 4 is a conceptual representation of the structure of a database table 311, according to one or more preferred and/or optional embodiments, it being understood that tables 312, 313 could have similar structure. Referring to FIG. 4, table 311 includes a header portion 401 and one or more table partitions 402A,402B,402C (herein generically referred to as feature 402). Each table partition 402 contains multiple records 403 (also called rows, entries, or tuples), each record 403 containing multiple data values logically organized as multiple fields 404-406. A large database table will typically have multiple partitions 402, each partition containing a respective disjoint subset of the records of the database table as a whole, although smaller tables may have only a single partition. Each database table partition 402 is conceptually represented in FIG. 4 as a table or array, in which the rows represent database records, and the columns represent database fields. However, as is known in the art, the actual structure of the database table in storage may vary due to the needs of data organization accommodating database updates, and so forth. A database table may occupy non-contiguous blocks of storage; database records may vary in length; some fields might be present in only a subset of the database records; and individual entries may be non-contiguous.

Associated with database table 311 is header portion 401. Header 401 is in fact data separate from the collection of records 403, and may be considered part of the database table 311 or may be considered a separate data structure. The header may or may not be stored in locations contiguous to the records 403. Header contains data for identifying the contents of the table, where it is located (e.g., pointers, arrays and other structures which identify the locations of the various partitions 402), certain essential parameters of the table, and so forth. In particular, in accordance with one or more preferred embodiments, header 401 contains a table identifier 407 and a current table size 408 (i.e., the number of record currently in table 311). In accordance with one or more embodiments, the header further contains various other data useful for managing the table.

Associated with the database tables are one or more auxiliary data structures 314-323, also sometimes referred to as metadata (of which ten are represented in FIG. 2, it being understood that the number and type of such structures may vary). Auxiliary data structures characterize the structure of the database and data therein, and are useful in various tasks involved in database management, particularly in executing queries against the database. Examples of auxiliary data structures include database indexes 314-317, histograms 318-319, and materialized query tables (MQT) 320-321. Auxiliary data structures may further include a query cache 322 in which data regarding previously executed queries (the query itself, query execution plan or execution strategy, run-time statistics from execution, etc.) is stored. Although a particular number and type of auxiliary database structures is illustrated in FIG. 3, it will be understood that the number and type of such structures may vary, that not all illustrated structures may be present, and/or that additional structures not shown may be present.

Figure 5:
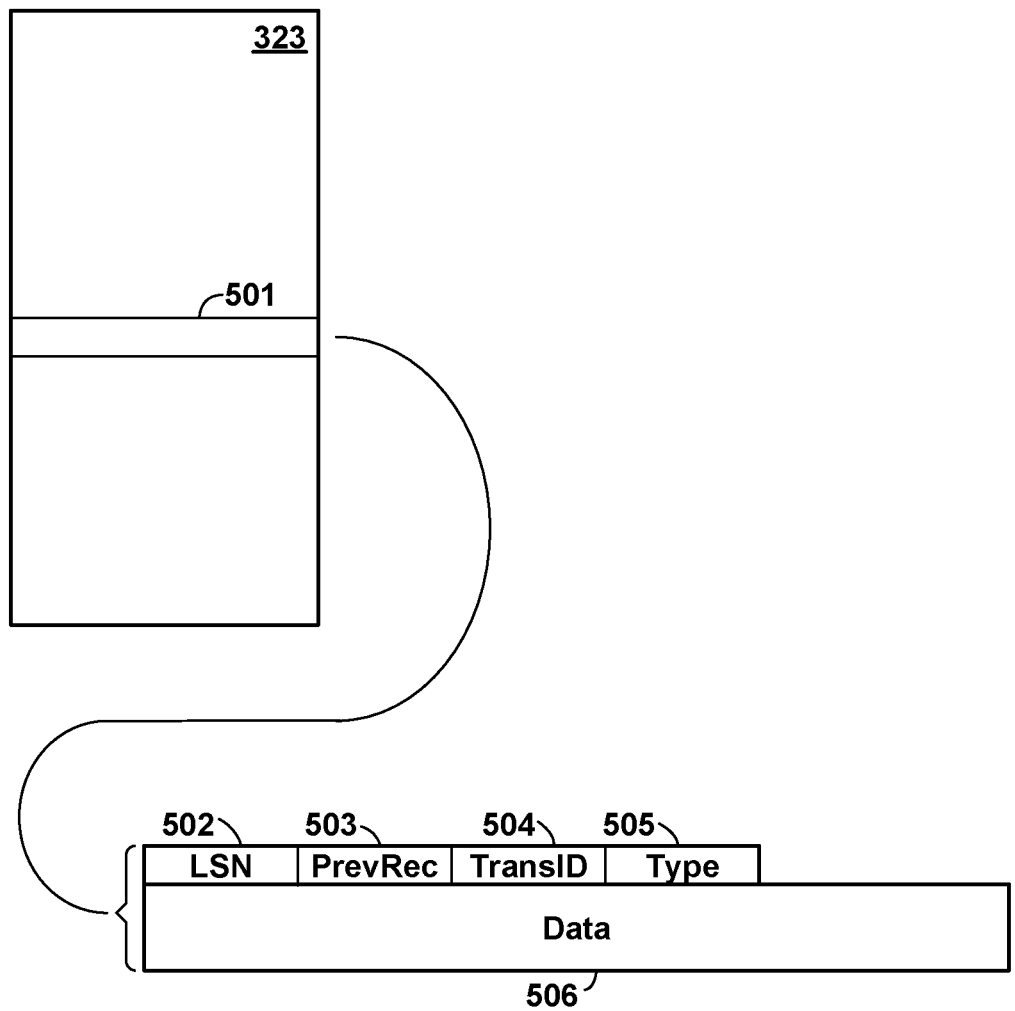
FIG. 5 is a conceptual representation of the structure of a database transaction log, according to one or more preferred and/or alternative embodiments.

Auxiliary database structures in storage further include a sequential transaction log 323 in which events affecting the database, and in particular, changes to data in database tables 311-313 and/or any of various metadata structures 314-321, are recorded. FIG. 5 is a conceptual representation of the structure of a sequential database transaction log 323, according to one or more preferred and/or alternative embodiments. The transaction log contains multiple entries or records 501, each entry recording a respective event or action taken with respect to the database. For example, an entry could record an update to a portion of database data, such as an update to a database record 403 within a database table 311-313, an addition or deletion of a database record 403, an update to a metadata structure 314-322, and so forth. A transaction log entry 501 could alternatively record certain actions taken with respect to the log itself, e.g. it might record that a previous entry in the log has been "rolled back" or undone, that a transaction (which may comprise multiple log entries) has completed, that a checkpoint in the log has been reached, and so forth.

In one or more embodiments, each transaction log entry 501 contains a respective Log Sequence Number (LSN) field 502 containing the LSN assigned to the corresponding entry, a previous log entry field 503 containing a link to the immediately preceding log entry, a transaction ID field 504 containing the transaction identifier of the transaction to which the log entry pertains, and a log entry type field 505 containing the type of log entry, e.g., an update entry, a checkpoint entry, etc. Additional data 506 in the log entry will depend on the type of log entry. For example, an update entry which records a change to a record in a database table contain the location of the block or page affected, length and offset of data changed, and before and after images of the data being changed. Other log entry types would contain other data corresponding to the needs of the log entry type, and in some cases may contain no other data at all.

The LSN is unique to each log entry, and is assigned sequentially to the log entries as they are generated and written to storage. I.e., each log entry has an LSN which is 1 more than the LSN of the immediately preceding log entry.

Database manager 301 is executable computer programming code which executes on CPU 101 to provide basic functions for the management of database 300. Database manager 301 may theoretically support an arbitrary number of database tables, which may or may not have related information, although only three tables are shown in FIG. 3. Database manager 301 preferably contains administrative maintenance functions 302 which automatically perform certain functions to manage the database and/or allow authorized users to perform basic administrative operations with respect to the database, such as defining and editing database table definitions, creating, editing and removing records in the database, viewing records in the database, defining database auxiliary data structures such as indexes and materialized query tables, views, and so forth. In one or more preferred embodiments herein, administrative functions include one or more of: (a) a log function 306 for writing log entries to the transaction log 323 in storage as corresponding events affecting the database occur; (b) a cache backup function 307 for asynchronously backing up portions of a database in memory 202 of a server system to another server system; and (c) a recovery function 308 for reconstructing the database to a consistent state on an alternate server system 102 in the event that one server crashes, fails, or otherwise becomes unavailable. Certain of these functions may be available only to system administrators and the like, while others are available to clients.

Database manager 301 preferably further includes a query engine 303 for executing queries against data in database tables 311-313 and a query optimizer 304 for generating optimized query execution plans for use by query engine 303 in executing queries. Database manager 311 further preferably includes an external interface 305 having one or more application programming interfaces (APIs) by which external applications can access data in database 300 either by invoking query engine 303 or through other means. Database manager 311 may further contain any of various more advanced database functions, as are known in the art. Database manager could be a generic database management system, such as one implementing a structured query language (SQL) query protocol, but it might alternatively query and structure data according to some other protocol and/or that it might be a custom designed database management system. Although database manager 311 is shown and described herein as an entity separate from an operating system kernel, it will be understood that in some computer architectures various database management functions are integrated with the operating system.

Although one database 300 having three database tables 311-313, nine auxiliary structures 314-322, and a sequential database log 323 are shown in FIG. 3, the number of such entities may vary, and could be much larger. A computer system or a cluster of computer systems may contain multiple databases, each database may contain multiple tables, and each database may have associated with in multiple indexes, MQTs, histograms, views, volatility records, and/or other auxiliary data structures not illustrated. Alternatively, some entities represented in FIG. 3 might not be present in all databases. Additionally, database 300 may be logically part of a larger distributed database which is stored on multiple computer systems. Although database manager 301 is represented in FIG. 3 as part of database 300, the database manager, being executable code, is sometimes considered an entity separate from the "database", i.e., the data.

Logical Partitioning of Servers

In one or more embodiments, the functions of accessing and managing data in database 300 on behalf of multiple clients are performed within a logical partition 106 of a physical computer system 102, the partition acting as a virtual machine performing the functions of a server node within cluster 101. Partitioning is a technique for dividing a single large computer system into multiple partitions, each of which behaves in some respects as a separate computer system. Computer system resources may be allocated in any of various ways for use by the virtual machines. A given resource may be allocated for exclusive use by a single particular virtual machine, or may be shared among all virtual machines (or some subgroup of virtual machines) on a time interleaved or other basis. Some resources may be allocated to respective particular virtual machines, while others are shared. Examples of resources which may be partitioned are CPU(s) 201, main memory 202, data storage within storage units 225-227, and network bandwidth. I/O adapters 211-214 are typically shared, although they could be partitioned as well.

Virtual machine partitioning of resources is virtual rather than physical. Computer system 200 preferably has physical data connections such as buses running among different hardware components, allowing them to communicate with one another. These hardware resources may be shared by and/or allocated to different virtual machines. From a physical configuration standpoint, there is generally no distinction made with regard to virtual machine partitions. The system's physical devices and subcomponents thereof are preferably physically connected to allow communication without regard to virtual machine partitions, and from this hardware standpoint, there is nothing which prevents a task executing in virtual machine A from writing to memory or storage allocated to virtual machine B.

Generally, allocation of resources to a virtual machine is enforced by a partition manager embodied as low-level encoded executable instructions and data, although there may be a certain amount of hardware support for virtual machine partitioning, such as special hardware registers which hold state information. The partition manager (and associated hardware, if any) prevent access by a virtual machine to the resources allocated to another virtual machine. Code enforcement of partitioning constraints generally means that it is possible to alter the virtual configuration of a partitioned computer system, i.e., to change the number of virtual machines or re-assign resources to different virtual machines, without reconfiguring hardware. In one or more preferred embodiments described herein, this low-level logical partitioning code is referred to as the "hypervisor".

Figure 6:
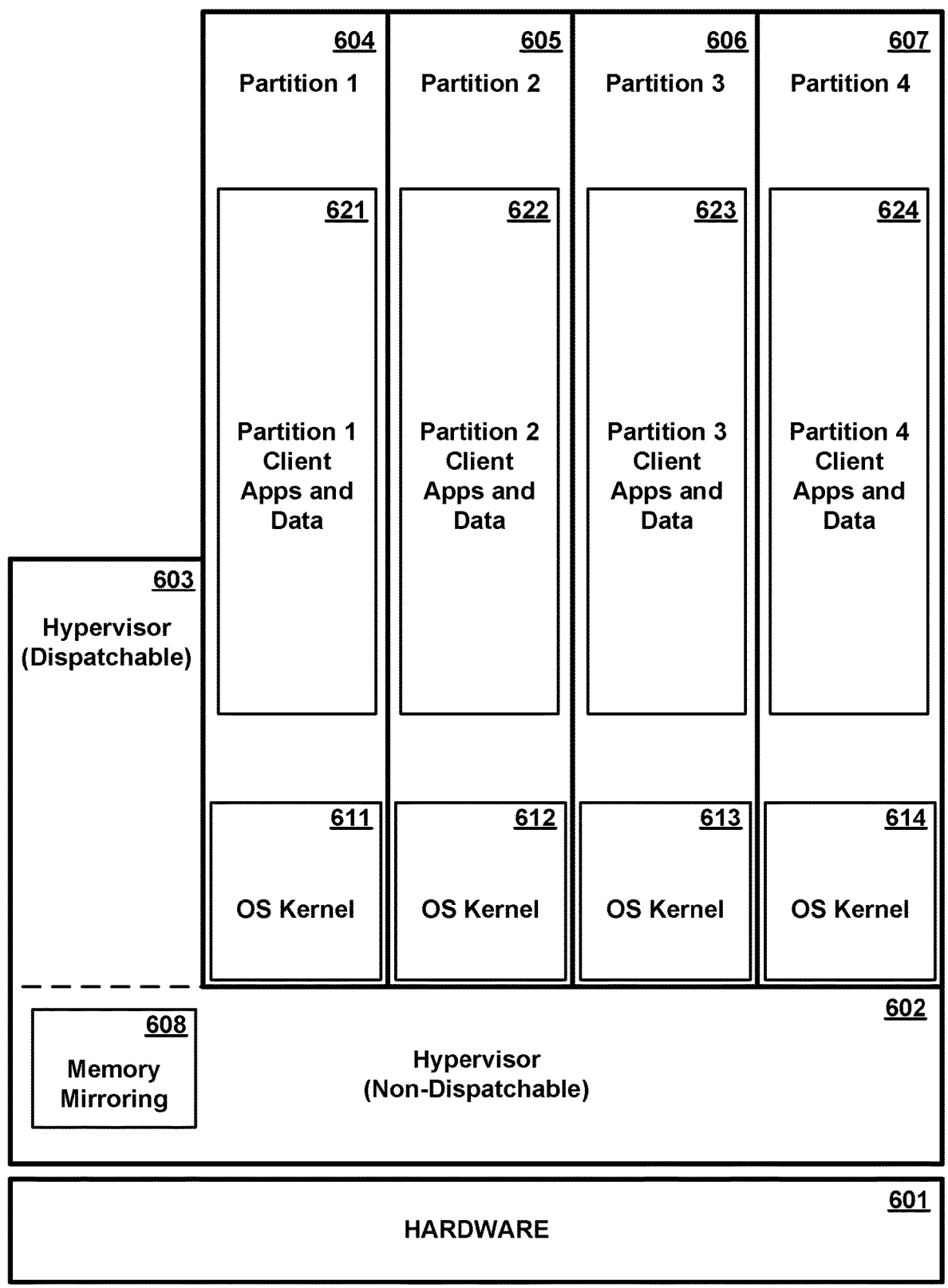
FIG. 6 is a conceptual illustration showing the existence of hypervisor code and virtual machine partitions at different hardware and software levels of abstraction in a computer system, according to one or more preferred embodiments.
Figure 7:
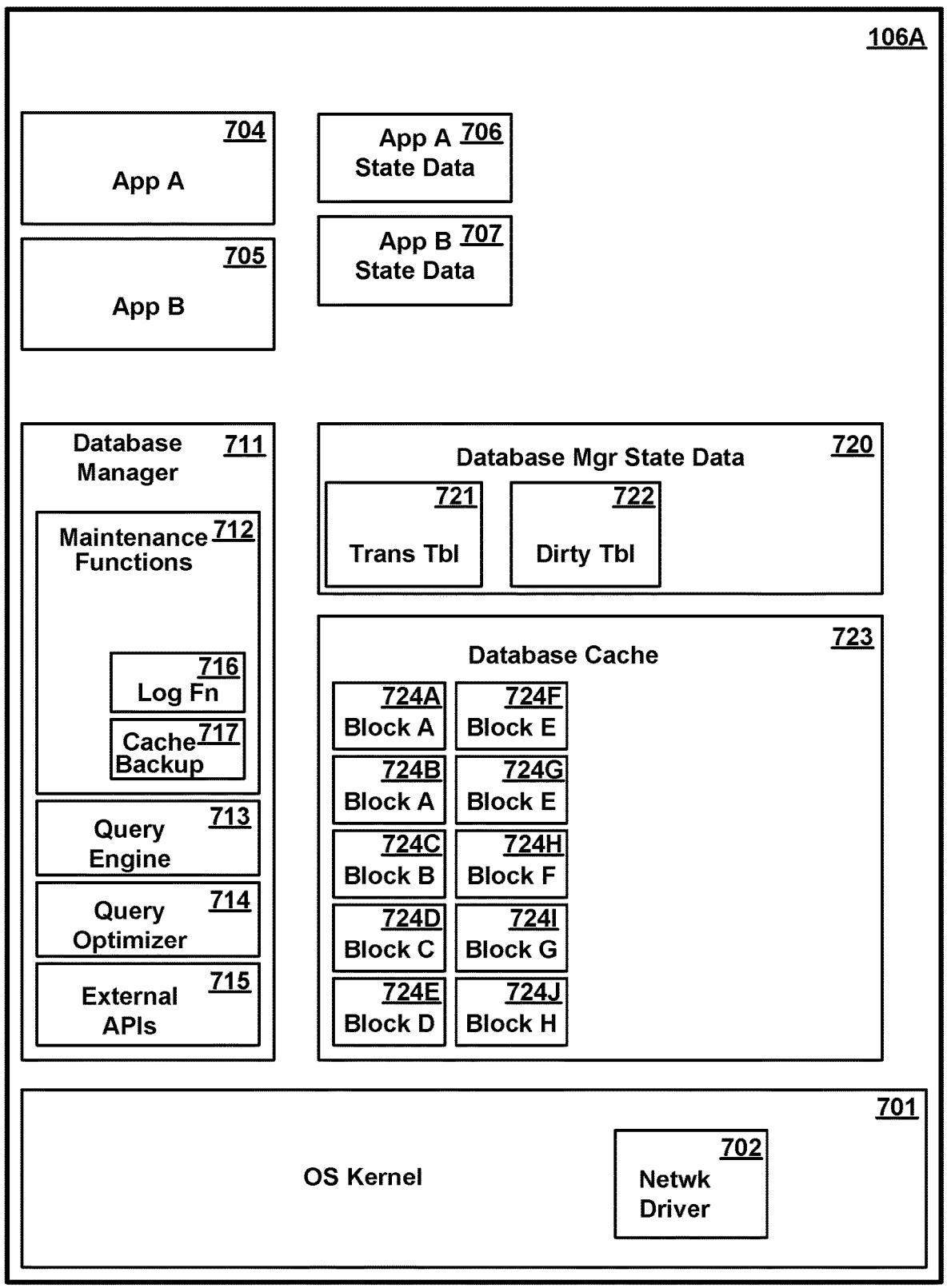
FIG. 7 is a conceptual illustration of the major software components in memory of a primary server computer system which accesses a database, according to one or more preferred and/or alternative embodiments.

FIG. 6 is a conceptual illustration showing the existence of hypervisor code and virtual machine partitions at different hardware and software levels of abstraction in a computer system 200. FIG. 6 represents a system having four client virtual machines in respective partitions 604-607, each executing one or more applications on behalf of one or more respective clients. These are designated "Partition 1", "Partition 2", etc., it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 6 and FIG. 7, the "higher" levels of abstraction are generally represented toward the top of the figure, while lower levels are represented toward the bottom.

As shown in FIG. 6 and explained earlier, logical partitioning of machine resources is a code-enforced concept. In general, at the hardware level 601, partition boundaries do not exist (although there may be certain special purpose registers or other hardware used to identify partition boundaries or other virtual machine aspects). As used herein, hardware level 601 represents the collection of physical devices (as opposed to data stored in devices), such as processors, memory, buses, I/O devices, etc., shown in FIG. 2, possibly including other hardware not shown in FIG. 2. As far as a processor 201 is concerned, it is merely executing machine level instructions. While code can direct tasks in certain partitions to execute on certain processors, there is nothing in the processor itself which dictates this assignment, and in fact the assignment can be changed by the code. Therefore the hardware level is represented in FIG. 6 as a single entity 601, which does not itself distinguish among partitions.

Partition boundaries among the various partitions are enforced by a partition manager (also known as a "hypervisor"), consisting of a non-relocatable, non-dispatchable portion 602, and a relocatable, dispatchable portion 603. The hypervisor is super-privileged executable code which is capable of accessing resources, such as processor resources and memory, assigned to any partition. The hypervisor maintains state data in various special purpose hardware registers, and in tables or other structures in general memory, which govern boundaries and behavior of the partitions. Among other things, this state data defines the allocation of resources to partitions, and the allocation is altered by changing the state data rather than by physical reconfiguration of hardware.

In the preferred embodiment, the non-dispatchable hypervisor 602 comprises non-relocatable instructions which are executed by any of processors 201 just as instructions for tasks executing in the partitions. The code is non-relocatable, meaning that the code which constitutes the non-dispatchable hypervisor is at fixed real addresses in memory 202. Non-dispatchable hypervisor 602 has access to the entire real memory address range of the computer system, and can manipulate real memory addresses. The dispatchable hypervisor code 603 (as well as all code executing within a partition) is contained at addresses which are relative to an address range assigned to the partition in which it executes, and therefore this code is relocatable. The dispatchable hypervisor behaves in much the same manner as a client's partition, but it is hidden from the clients and not available to execute user applications. In general, non-dispatchable hypervisor 602 handles assignment of tasks to physical processors, memory mapping and partition enforcement, and similar essential tasks required to execute application code in a partitioned system, while dispatchable hypervisor 603 handles maintenance-oriented tasks, such as creating and altering partition definitions.

As represented in FIG. 6, there is no direct path between higher levels (levels above non-dispatchable hypervisor 602) and hardware level 601. While machine instructions of tasks executing at higher levels can execute directly on a processor 201, access to hardware resources is controlled by the non-dispatchable hypervisor. Non-dispatchable hypervisor 602 enforces partition boundaries of processor resources. I.e., task dispatchers at a higher level (the respective operating systems) dispatch tasks to virtual processors defined by the partition parameters, and the hypervisor in turn dispatches virtual processors to physical processors at the hardware level 601 for execution of the underlying task. The non-dispatchable hypervisor also enforces partitioning of other resources, such as allocations of memory to partitions, and routing I/O to I/O devices associated with the proper partition. Dispatchable hypervisor 603 performs many auxiliary system management functions which are not the province of any client partition. The dispatchable hypervisor generally performs higher level virtual machine management operations such as creating and deleting partitions, concurrent hardware maintenance, allocating processors, memory and other hardware resources to various partitions, etc.

In accordance with one or more preferred embodiments, non-dispatchable hypervisor 602 further includes a memory mirroring function 608 which mirrors pre-defined regions of memory allocated to one or more partitions to another device, the operation of which is explained in greater detail herein.

Above non-dispatchable hypervisor 602 are a plurality of partitions 604-607. Each partition behaves, from the perspective of processes executing within it, as an independent computer system, having its own memory space and other resources, and for this reason is also referred to as a virtual machine. Each partition therefore contains a respective operating system kernel herein identified as the "OS kernel" 611-614. At the level of the OS kernel and above, each partition behaves differently, and therefore FIG. 6 represents the OS Kernel as four different entities 611-614 corresponding to the four different partitions. In general, each OS kernel 611-614 performs roughly equivalent functions. However, it is not necessarily true that all OS kernels 611-614 are identical copies of one another, and they could be different versions of architecturally equivalent operating systems, or could even be architecturally different operating systems. OS kernels 611-614 perform a variety of task management functions, such as task dispatching, paging, enforcing data integrity and security among multiple tasks, and so forth.

Above the OS kernels in each respective partition there may be any of various applications and data 621-624. In particular, in accordance with one or more preferred embodiments, one of the partitions functions as a virtual database server machine for accessing database 300 on behalf of remote clients 105. Although applications and data 621-624 have the same appearance in the conceptual representation of FIG. 6, it will be understood that in general each partition includes different applications and data, and that the resources allocated to each partition may vary.

While various details regarding a partitioned system architecture for supporting multiple virtual machines have been described herein as used in one or more preferred embodiments, it will be understood that many variations in the mechanisms used to enforce and maintain logical partitions are possible consistent with the present invention, and in particular that administrative mechanisms such as a non-dispatchable hypervisor, dispatchable hypervisor, and so forth, may vary in their design, or that some systems may employ some or none of these mechanisms, or that alternative mechanisms for supporting and maintaining multiple partitions may be present. It will further be understood that a database server machine supporting access to database 300 on behalf of multiple clients could alternatively be embodied as a dedicated hardware system which is not logically partitioned, and in which all the hardware resources of the computer system 200 are available.

During normal operation, one of the logical partitions 106A within a server system 102 is designated the primary database server of a particular database 300, and performs all database accesses to that database on behalf of clients 105. Another logical partition 106B is designated the secondary database server, and functions as a backup database server for accessing database 300 in the event that the primary database server becomes unavailable for any of various reasons. Preferably, the primary database server's partition and the secondary database server's partition are located in separate physical server machines 102 within cluster 101 for greater redundancy. However, it would alternatively be possible for the primary and secondary to be located in the same physical machine.

During execution on the primary database server, selective portions of database 300 are loaded into a "database cache" in physical memory 202 of the physical computer system 200 supporting the primary database server, enabling execution of the database manager 301 on one or more processors 201 and access to data in the database. Due to memory and other constraints, these selective portions typically comprise only a small portion of the entire database at any given time.

FIG. 7 is a conceptual illustration of the major software components in memory allocated to a logical partition 106A (equivalent to any of partitions 621-624 of FIG. 6) of a primary database server computer system which accesses database 300, according to one or more preferred and/or alternative embodiments. Operating system kernel 701 (equivalent to any of OS Kernel 611-614 shown in FIG. 6) is executable code and state data providing various low-level software functions, such as device interfaces, management of memory pages, management and dispatching of multiple tasks, etc. as is well-known in the art. In particular, OS kernel 201 preferably includes one or more network adapter drivers 702 for handling communications with one or more networks via network adapters 214.

Database manager 711 includes a working subset of executable code of database manager 301 needed for performing database management functions. Typically, the portion of database manager 711 in memory of primary partition memory 106A at any given time is less than all of the executable code of database manager in storage 301. Many functions of database manager 301 are performed only rarely, and would be loaded into memory only as needed. In the illustration of FIG. 7, certain maintenance functions 712 are loaded into memory, include at least parts of log function 716 and cache backup function 717. Database manager 711 further includes at least parts of query engine 713, query optimizer 714, and external APIs 715. However, as illustrated in FIG. 7, database manager 711 in memory 202 typically does not include a recovery function, shown in storage as feature 308, because during normal operation no recovery is taking place.

Memory of primary partition 106A further includes certain database manager state data 720 required by the database manager to manage database transactions, and a database cache 723 containing portions of database tables 311-313 and/or metadata 314-322. In particular, state data 720 includes a transaction table 721 and a dirty block table 722. The transaction table contains a record of all database transactions that are currently in progress and the LSN of the last entry in the database log 323 that was a part of the corresponding database transaction. The dirty block table (which in some implementations is called a dirty page table) 722 contains a record of all blocks in database cache 723 which have been modified and not yet written back to storage, and for each such block, the corresponding LSN of the first log entry which caused the block to become dirty.

Database cache 723 contains a plurality of blocks 724A-J (herein referred to generically as feature 724. As used herein, a block is the smallest unit of data which the database manager can retrieve from or write to storage independently. A block is a copy of corresponding data in storage when retrieved, although it may be subsequently modified while in memory. A block may correspond in size to a page used by the operating system, although it may alternatively be some multiple of pages, or some portion of a page. Each block may include data from any of tables 311-313, or from any of metadata structures 314-322. In the case of a relatively small table or structure, the block may include the entire table or structure, although more typically the block will contain only a portion of the data in the corresponding table or structure.

Figure 9:
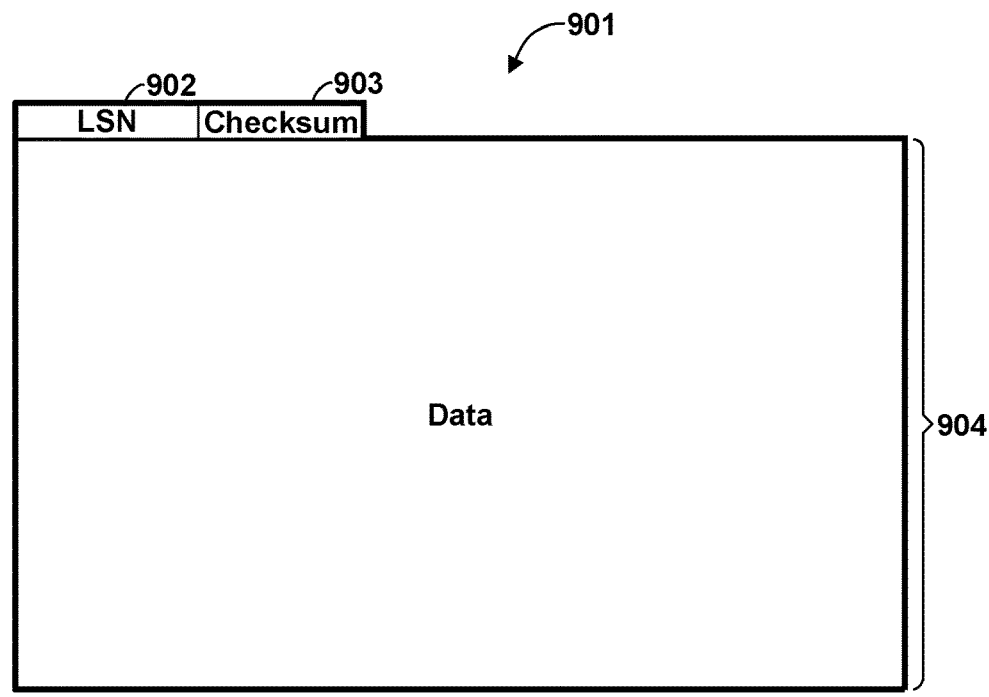
FIG. 9 is a conceptual representation of the structure of a database block within either the database cache or storage, according to one or more preferred embodiments.

FIG. 9 is a conceptual representation of the structure of a database block within either the database cache or storage, according to one or more preferred embodiments. A database block 901 could be any of blocks 724A-J in the primary server's database cache 723, or any of blocks 824A-J in the secondary server's database cache 823, or a block in storage. Each block 901, whether in memory or in storage, includes a corresponding LSN 902 and a checksum 903. The data 904 in the block could be data from any of database tables 311-313 or metadata structures 314-322, and if from a database table, would typically contain multiple records of the corresponding database table. The LSN 902 of a block 901 is the LSN of the most recent log entry which has been written into the block. Thus, if the LSN of the block in memory is the same as the LSN of the block in storage, the two blocks have been updated to the same event, and contain identical data. If the LSN of the block in memory is more recent than the LSN of the block in storage, then the block in memory has been updated one or more times after retrieving it from storage, and the updates have not yet been written out to storage. The checksum 902 is a checksum computed across the entire block 901, and is used to verify that the entire block contents are current.

Database cache 723 is just that, and is used during normal operation as a cache of most recently accessed database data. An update to a record in the database will attempt to update data in database cache 723 first, and if the corresponding record does not exist in cache 723, the block containing the record will be retrieved from storage. A query against the database will be executed, insofar as possible, using data in database cache 723, and to the extent that the query requires additional data, the corresponding block or blocks will be retrieved from storage. The contents of cache 723 are continually changing as additional blocks are retrieved into the cache and blocks no longer needed are deleted from the cache and, if necessary, written out to storage.

In addition to database manager 711, database manager state data 720, and database cache 723, memory of primary partition 106A may include all or selective portions of one or more user applications 704-705 and corresponding application state data 706-707. User applications 704-705 are applications which execute on CPU(s) 201, and may access data in database 310 to perform tasks on behalf of one or more users. Such user applications may include, e.g., sales transactions, inventory management, personnel records, accounting, code development and compilation, mail, calendaring, or any of thousands of user applications, and may be web-based (i.e., present web pages to a remote client for rendering in the client's browser) or provide some other form of user interface. Some of these applications may access database data in a read-only manner, while others have the ability to update data. There may be many different types of read or write database access tasks, each accessing different data or requesting different operations on the data. For example, on task may access data from a specific, known record, and optionally update it, while another task may invoke a query, in which all records in the database are matched to some specified search criteria, data from the matched records being returned, and optionally updated. Furthermore, data may be read from or written to database tables 311-313 directly, or may require manipulation or combination with other data supplied by a user, obtained from another database, or some other source. Applications 704-705 typically utilize function calls to database manager 711 through external APIs 715 to access data in the database, and in particular, to execute queries against data in the database, although in some systems it may be possible to independently access data in the database directly from the application. Although two applications 704-705 and corresponding state data 706-707 are shown for illustrative purposes in FIG. 7, the number of such applications may vary.

Figure 8:
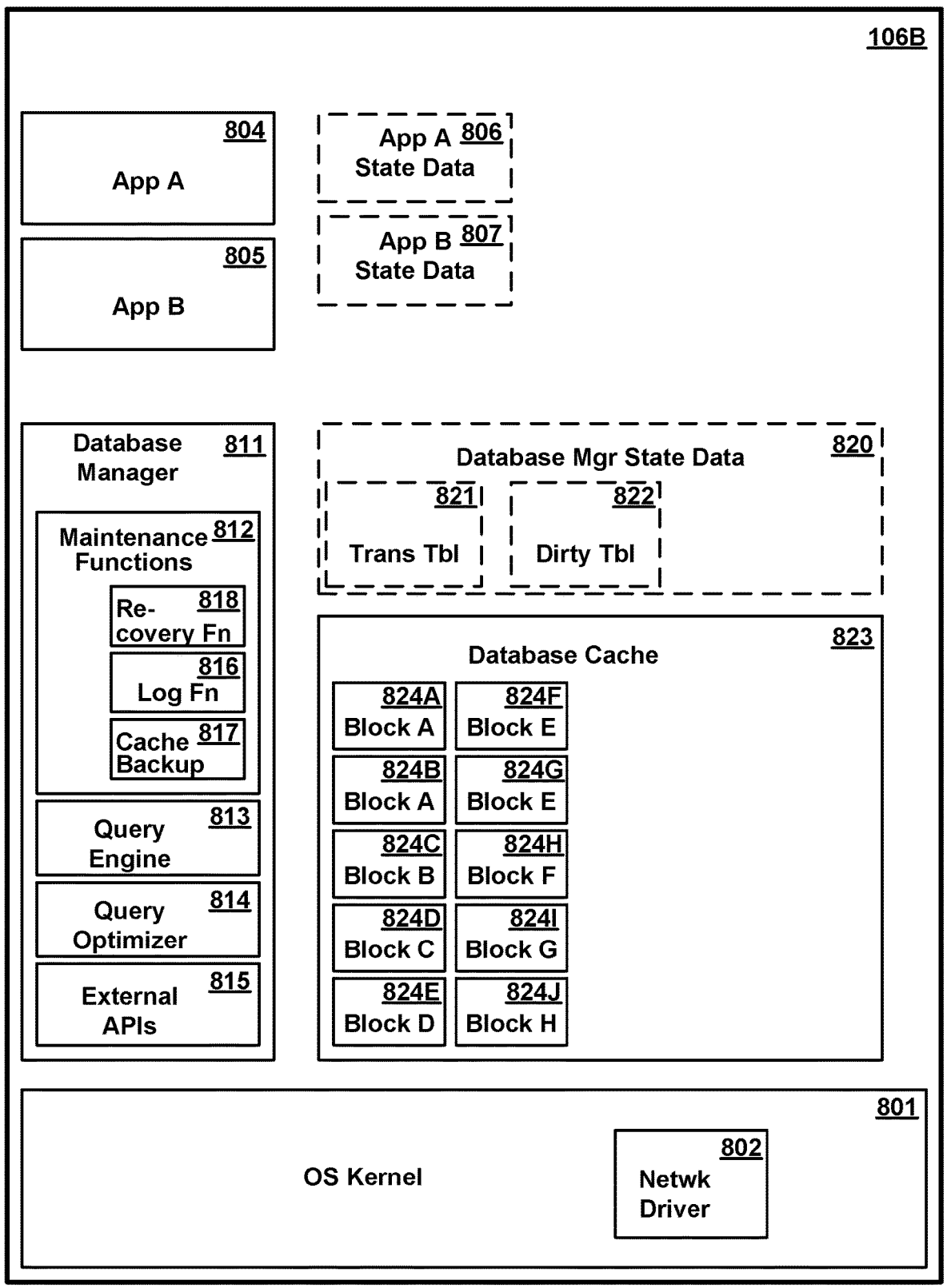
FIG. 8 is a conceptual illustration of the major software components in memory of a secondary database server which acts as a standby backup database server to access a database in the event of failure of the primary database server, according to one or more preferred and/or alternative embodiments.

FIG. 8 is a conceptual illustration of the major software components in memory allocated to a logical partition 106B (equivalent to any of partitions 621-624 of FIG. 6) of a secondary database server which acts as a standby backup database server to access database 300 in the event of failure of the primary database server, according to one or more preferred and/or alternative embodiments. In general, the software components of secondary server partition 106B correspond to respective components in primary server partition 106A and are intended to perform similar respective functions in the event the secondary server takes over for the primary. As shown in FIG. 8, secondary server partition 106B includes OS kernel 801, network adapter drivers 802, database manager 811, maintenance functions 812, log function 816, cache backup function 817, query engine 813, query optimizer 814, external APIs 815, database manager state data 820, transaction table 821, dirty block table 822, database cache 823, blocks 824A-H, user applications 804-805, and application state data 806-807. These correspond to OS kernel 701, network adapter drivers 702, database manager 711, maintenance functions 712, log function 716, cache backup function 717, query engine 713, query optimizer 714, external APIs 715, database manager state data 720, transaction table 721, dirty block table 722, database cache 723, blocks 724A-H, user application 704-705, and application state data 706-707, respectively, of primary database partition 106A. Although various software entities of FIG. 8 correspond to similar entities of FIG. 7, it is not necessarily true that identical portions of corresponding entities are loaded into memory at the same time.

During normal operation in which database access is performed in primary database server partition 106A and secondary database server partition 106B is acting as a standby backup, database manager state data 820, including transaction table 821 and dirty block table 822, are not maintained in the secondary partition 106B, and no attempt is made to mirror corresponding state data 720 in the primary database server partition. These structures may exist in skeletal form while the secondary is acting as a standby backup, or may not exist at all. If the primary server fails and the secondary server takes over its database access functions, database manager state data 820 will be reconstructed and/or generated anew in the secondary server partition 106B. Database manager state data 820 and included transaction table 821 and dirty block table 822 are accordingly illustrated in dashed lines in FIG. 8. Application state data structures 806, 807 are similarly not mirrored.

In addition to various software entities present in primary database server partition 106A, the secondary partition 106B contains a database recovery function 818. Upon failure of the primary database server, database recovery function 818 uses database cache 823 and database log 323 to recover the database to a consistent state in the secondary partition 106B. Recovery to a consistent state does not mean that the state is exactly what it was immediately before the primary server failed, because certain state data can not be known, but that any transactions which were completed and written to the log are recovered in whole, and that any partially completed transactions are reversed to avoid inconsistent data which could result. This recovery process is described in greater detail herein.

Various software entities are represented in FIGS. 3-8 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIGS. 3-8, it will be understood that the actual number of such entities may vary, and in particular, that in a complex database environment, the number and complexity of such entities is typically much larger. Additionally, although certain software components are depicted in FIGS. 7 and 8 within respective single partitions 106A, 106B for completeness of the representation, it is not necessarily true that all programs, functions and data will be present in a single partition, and may be present in another partition on the same computer system or in a different computer system. For example, user applications 704-705 or 804-805 which call APIs to access the database may be on a separate system from certain maintenance functions such as defining the database, adding or deleting metadata structures, and so forth. Finally, it will be understood that the conceptual representations of FIGS. 6-8 are is not meant to imply any particular memory organizational model, and that a computer system hosting a database might employ a single address space virtual memory, or might employ multiple virtual address spaces which overlap.

Redundant Database Server Operation

In accordance with one or more preferred embodiments, during normal operation of a primary database server within the primary server's partition 106A, another partition (preferably within a different physical server 102) is allocated for use as a secondary server partition 106B. The secondary server partition is intended as a standby or backup system, for use in the event of failure of the primary partition. The secondary server partition is idle while the primary partition is operational. This may mean, for example, that some of the secondary server partition's virtual resources, such as shared processor resources, are released for use by other partitions executing on the same physical computer system. However, at least some of the memory resources of the physical system 102 in which the secondary partition 106B is located are allocated to the partition and data is stored therein. In particular, at least some of the memory resources of the secondary partition are allocated for use as a database cache 823, mirroring the database cache 723 in the primary partition 106A. Database cache 823 within secondary partition 106B is preferably the same size, and occupies the same virtual address range within its partition, as does database cache 723 in primary partition 106A.

Figure 10:
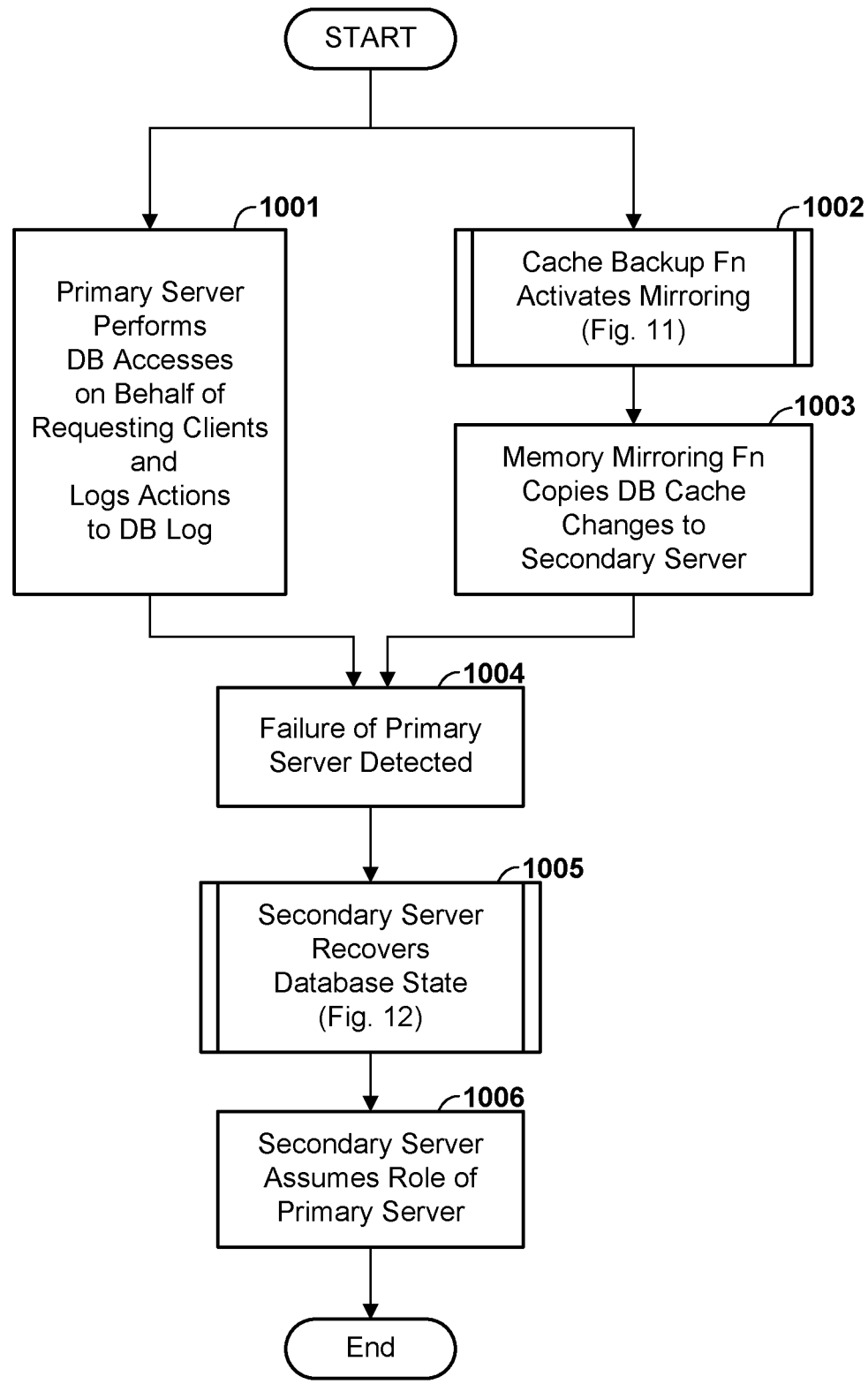
FIG. 10 is a flow diagram illustrating at a high level the operation of a primary database server, detection of failure, and recovery in a secondary database server, according to one or more preferred embodiments.

FIG. 10 is a flow diagram illustrating at a high level the operation of a primary database server, detection of failure, and recovery in a secondary database server, according to one or more preferred embodiments.

Referring to FIG. 10, the primary database server performs database access actions on behalf of multiple clients 105 responsive to client requests (box 1001). At least some of these actions involve changes to data in database tables 311-313. As these actions are performed, they are logged in sequential database log 323, as is well known in the database art. In general, entries to the log are written to non-volatile storage before pages or blocks of data representing tables 311-313 can be written to storage. Among the functions of the log is to provide a record of changes made, in the event of failure of the primary database server and loss of data in its volatile memory.

In one or more preferred embodiments, cache backup function 717 in the primary server partition 106A invokes a low-level memory mirroring function 608 in the hypervisor to mirror the contents of the database cache 723 to the corresponding cache 823 in the secondary server partition 106B. This is represented as box 1002 in FIG. 10, and shown in greater detail in FIG. 11.

Figure 11:
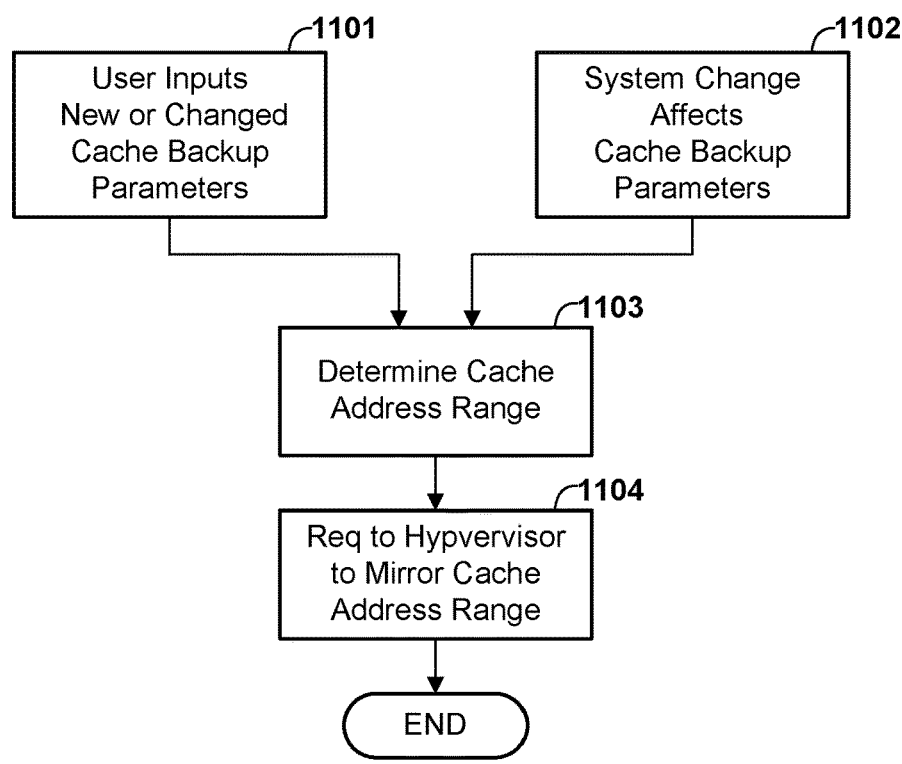
FIG. 11 is a flow diagram illustrating at a high level the operation of a database cache backup function in the primary database server, in accordance with one or more preferred embodiments.

Referring to FIG. 11, which is a flow diagram illustrating the operation of cache backup function 717 in the primary database server partition 106A in accordance with one or more preferred embodiments, the cache backup function is normally idle, and may be activated either as a result of user input from a database administrator or the like to change the parameters governing cache backup (represented as box 1101), or as a result of certain changes made automatically by the database manager or other system components (represented as box 1102). In the former case, the user may, for example, command the database manager to activate cache backup through an interactive interface provided by database manager 711. The user may specify a secondary server node 106B, or the secondary node may be implied by the configuration. Backup of the database cache may be the default user option, or the default may be to deactivate cache backup. Alternatively, a user may change certain cache backup parameters, such as the designation of the secondary server to which the database cache is backed up. Alternatively, the user may command the database manager to discontinue cache backup which was previously operational. Changes made automatically by the system could include, for example, the allocation of additional memory to the database cache 723 by performance monitoring/enhancing software.

If cache backup function 717 is activated (either by specific user command or otherwise), the cache backup function 717 determines the applicable backup parameters to be specified to the memory mirroring function, and in particular, the virtual address range of database cache 723, i.e., the address range in the virtual address space of database manager 711 (box 1103). The cache backup function then invokes a memory mirroring function 608 in the hypervisor 602 of the physical system 102 in which primary partition 106A resides by requesting that the particular range of virtual addresses allocated to database cache 723 be mirrored to a designated secondary node 106B (box 1104). Depending on the addressing scheme used by a particular system, this may require translation of the address through OS 701.

As the primary database server in primary database partition 106A performs database access functions on behalf of clients, an asynchronous background process mirrors the contents of its database cache 723 to the corresponding database cache 823 in the memory of the secondary database partition 106B (box 1003). Specifically, as blocks are loaded and changes are made to blocks in the primary's database cache 723, the blocks are copied to the secondary's database cache 823. The copied blocks are stored at the same virtual address location within the secondary's database cache that they occupied in the primary's cache. As a result, any change to a pre-existing block within the cache simply overwrites the pre-existing contents of the secondary's cache at that location. Similarly, if a block is deleted from the primary's cache and a new block stored in its place at the same virtual address location, the new block will eventually overwrite the original block in the secondary's cache as well. Since the mirroring is an asynchronous background process, there could be a small time interval between a change to a block in the primary's cache and the storing of the corresponding change in the secondary's cache, so that the most current version of a block is not always available in the secondary's cache. As explained in greater detail herein, a recovery process uses such blocks as are available from the secondary's cache during recovery, verifies that any blocks it does use are current, and reconstructs any unavailable blocks from the underlying database structures and the database log 323 in storage. Thus, the two caches are not necessarily synchronized, nor are they required to be.

In one or more preferred embodiments, memory mirroring function 608 is a general purpose data mirroring function, which operates asynchronously to any of the functions of database manger 711 and mirrors data at a specified virtual address range without regard to content. I.e., memory mirroring function need not know the structure of database tables or blocks, and simply copies data from a source to a destination as pages are loaded or changed. No synchronization is required between database operations and the low-level copying of data by the data mirroring function, i.e., the mirroring function provides no feedback to the database that particular pages or blocks have been copied, and the database manager 711 does not condition any database operations on whether the mirroring function has or has not copied a particular block or page to the secondary server. Memory mirroring function could be, but is not necessarily, mirroring other address ranges in the same or other partitions within the same server system 102 concurrently with mirroring database cache 723. Although the memory mirroring function 608 is described herein as part of the hypervisor 602, it will be appreciated that it could alternatively be an operating system function.

In operation, upon receipt of the request to mirror data, the memory mirroring function records the virtual address range of data to be mirrored and the destination (the secondary database server) of the data to be mirrored in a table or other data structure. Any pages of data within the specified virtual address range which are subsequently loaded into memory are copied by transmitting them over the network to the destination device. Additionally, any modifications to existing pages in memory are similarly copied to the destination device. In the case of a modification, it is not necessary to copy the entire page, although mirroring could be implemented in such a manner.

Mirroring could be implemented using any of various conventional devices. For example, when a page is loaded into memory, the virtual address can be checked against the table of data addresses to be mirrored. If it is to be mirrored, the page can be placed on a queue of data to be written to the secondary device, and an indication of mirroring can be added to a field in the page table (or TLB). Any subsequent changes to such a page would be identified, and the change placed on a queue of data to be written to the secondary device.

Because the memory mirroring function is a low-level function without knowledge of how data is structured by the database, it does not attempt to copy whole database blocks. There is a possibility that a block will become unsynchronized in the secondary database cache 823 as a result of copying a part of a change without copying all of it. Any lack of synchronization of a block will be detected at recovery time by verifying the checksum for the block.

At some point during operation, a failure of the primary device may occur (box 1004). Failure represents an inability of the primary device to perform its function, whether due to loss of power, catastrophic hardware failure, software crash, or other cause. Failure may be detected by any of various conventional means. Failure triggers a recovery of the database to a consistent state in the secondary server, represented in FIG. 10 as box 1005, and shown in greater detail in FIG. 12, described below. Once the database has been recovered to a consistent state in the secondary database server, the secondary server assumes the role of the primary server, and thereafter performs database accesses on behalf of requesting clients (box 1006).

Recovery of the Database

Figure 12:
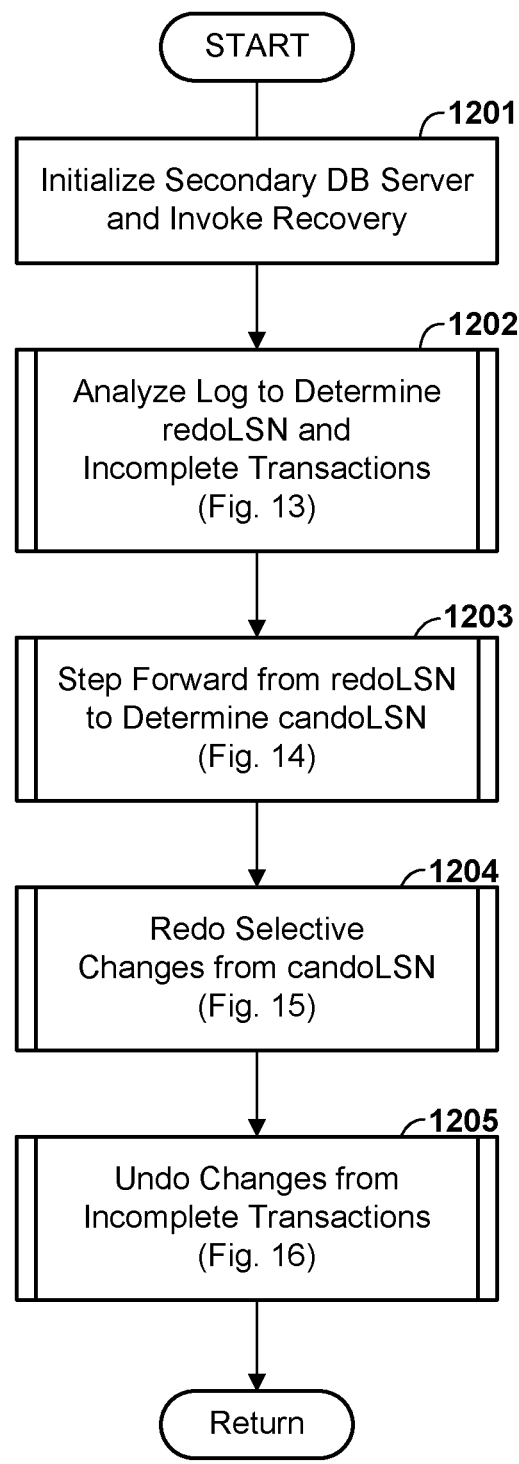
FIG. 12 is a flow diagram illustrating at a high level a recovery process of restoring a database in a secondary (standby) database server to a consistent state following failure of a primary database server, in accordance with one or more preferred embodiments.

In one or more preferred embodiments, in the event that the primary database server fails to function, the database can be recovered to a consistent state in a secondary database server (preferably embodied as standby logical partition 106B within a different physical server computer system 102). FIG. 12 is a flow diagram illustrating at a high level a recovery process of restoring a database in a secondary (standby) database server to a consistent state following failure of a primary database server, in accordance with one or more preferred embodiments. The database is not available for normal data access operations until recovery is completed.

Referring to FIG. 12, upon detecting failure of the primary database server, the standby logical partition is initialized and the recovery process is invoked (box 1201). Preferably, at least a minimal amount of operating system kernel 801 and database manager 811 code is pre-installed in the secondary database server and in an idle state prior to failure of the primary database server, to reduce the time required for recover. To the extent any required code is not pre-installed, it may need to be loaded to partition memory as part of initialization. It may additionally be necessary to allocate additional resources to the secondary server's logical partition 106B. For example, additional processor resources, which are not needed while the secondary partition is idle, may be allocated to the secondary server's logical partition to handle the increased processing load of database recovery and subsequent database operation.

Following initialization, the first stage of recovery is to analyze the database log 323 in storage to determine a redoLSN and any incomplete transactions at the time of primary server failure. The redoLSN represents a lowest LSN for which it can not conclusively be determined that the corresponding record update has been written to storage, and is a starting point for the next stage. This process is represented in FIG. 12 as box 1202, and shown in greater detail in FIG. 13.

In a second stage, a candoLSN is then determined by stepping forward through the log entries beginning with the redoLSN determined at box 1202. The candoLSN represents the lowest LSN for which there is not corresponding valid block in the database cache 823. The process of determining the candoLSN is represented in FIG. 12 as box 1203, and is shown in greater detail in FIG. 14.

In a third stage, beginning with the candoLSN, selective blocks of the database are read into database cache 823 from storage and corresponding data changes from the log are applied as necessary to update the blocks. This process is represented in FIG. 12 as box 1204, and is shown in greater detail in FIG. 15.

In a fourth stage, the recovery process then reverses (performs "undo" with respect to) any changes which were part of an incomplete transaction as determined earlier in box 1202. This "undo" process is represented in FIG. 12 as box 1205, and is shown in greater detail in FIG. 16.

Figure 13:
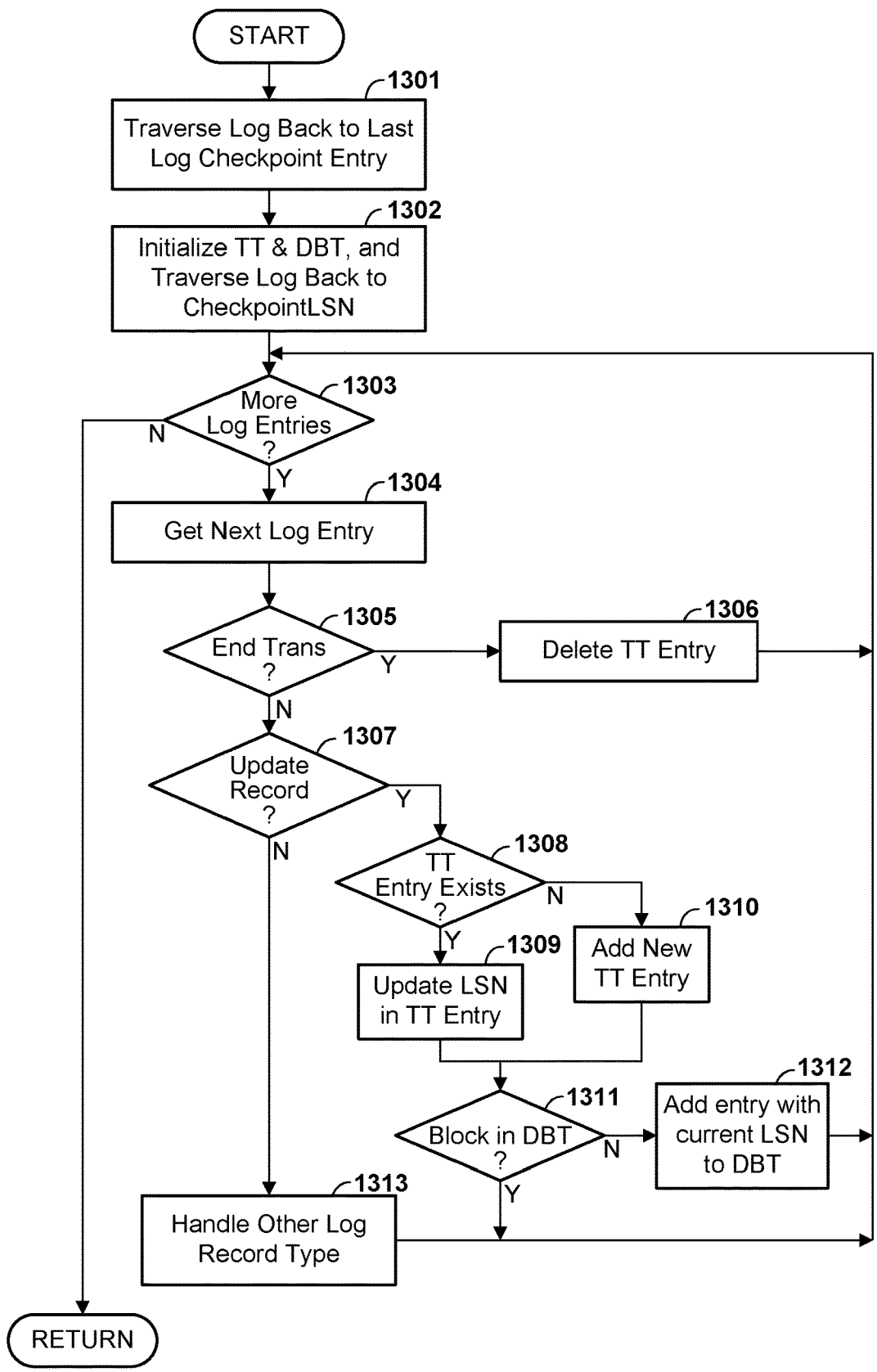
FIG. 13 is a flow diagram illustrating in greater detail a process of determining a redoLSN and a set of all incomplete transactions at the time the primary system failed, in accordance with one or more preferred embodiments.

FIG. 13 is a flow diagram illustrating in greater detail a process of determining a redoLSN and a set of all incomplete transactions at the time the primary system failed, in accordance with one or more preferred embodiments. In these embodiments, a dirty block table (DBT) 822 and a transaction table (TT) 821 are reconstructed in memory of the secondary server system, from which this information is extracted. The DBT thus reconstructed may in fact contain a superset of all dirty blocks, but from the standpoint of data integrity it is only necessary that every dirty block be in the DBT. The existence of additional entries in the DBT referencing blocks which are not in fact dirty may cause redundant writes to storage, but will not affect database integrity.

Referring to FIG. 13, the recovery process traverses the database log 323 from storage backwards until it reaches the most recent checkpoint entry in the log (box 1301). This checkpoint entry will contain a checkpointLSN, and a copy of the TT 721 and the DBT 722 as they existed in memory of the primary server's partition 106A at the time of the checkpoint, although they may have subsequently been changed between that time and the time the primary server failed. The checkpoint is a moment in time at which a snapshot of the database state is taken, the "checkpointLSN" being a current LSN at this moment in time. The "checkpointLSN" is not necessarily the LSN of the checkpoint entry in the log, since there is typically a small time lag between the checkpoint and the time that all checkpoint data can be assembled and written to the log.

The TT and DBT are therefore read from the checkpoint log entry, and used as the initial TT 821 and DBT 822 in the secondary server's partition 106B for purposes of recovery analysis (box 1302). Additionally, if the checkpointLSN is previous to the LSN of the checkpoint entry in the log, the log is further traversed back to the checkpoint LSN as required.

The recovery process then steps forward through the log entries, one entry at a time. If a next entry exists (the 'Y' branch from box 1303), the next entry is parsed and its type determined (box 1304). If the log entry is an entry indicating the completion of a transaction (the 'Y' branch from box 1305), the corresponding transaction entry in the TT 821 is deleted (box 1306), and the process continues to box 1303 to select a next log entry.

If the current log entry causes an update to a record (either in a database table 311-313 or metadata 314-322), the 'Y' branch from box 1307 is taken. In this case, a determination is made whether an entry in the TT 821 exists for the transaction to which the current log entry pertains (box 1308). If such an entry exists (the 'Y' branch from box 1308), then the LSN of the corresponding transaction entry in TT table 821 is updated with the LSN of the current log entry (box 1309). This update is performed because the TT entries should indicate the LSN of the most recent update within the corresponding transaction. If no entry exists in the TT 821 (the 'N' branch from box 1308), then the current log entry is the first log entry of the corresponding transaction, i.e., indicates the beginning of a transaction. In this case, a new entry is added to TT 821 (box 1310), the LSN of the new TT entry being initialized to the LSN of the current log entry.

If there is no entry in DBT 822 corresponding to the block modified by the current log entry (the 'N' branch from box 1311), then an entry corresponding to the block modified by the current log entry is added to the DBT, the entry being initialized with the LSN of the current log entry (box 1312), and the process continues to box 1303 to select a next log entry. If an entry for the modified block already exists in the DBT, then box 1312 is skipped.

If, at box 1307, the current log entry does not cause a modification of a database record, the 'N' branch is taken from box 1307, and the log entry is handled as appropriate (box 1313). Depending on the type of log entry and the database design, this may involve doing nothing at all, or may involve updating other records (not shown). In some databases, it may be possible to infer from a log entry that a particular block has been written to storage, allowing any DBT entry for the corresponding block, if one exists, to be deleted. After handling the log record as appropriate, the process continues to box 1303 to select a next log entry.

When all log entries from the checkpoint forward have been thus selected and analyzed, the 'N' branch is taken from box 1303 to return from the first stage.

Figure 14:
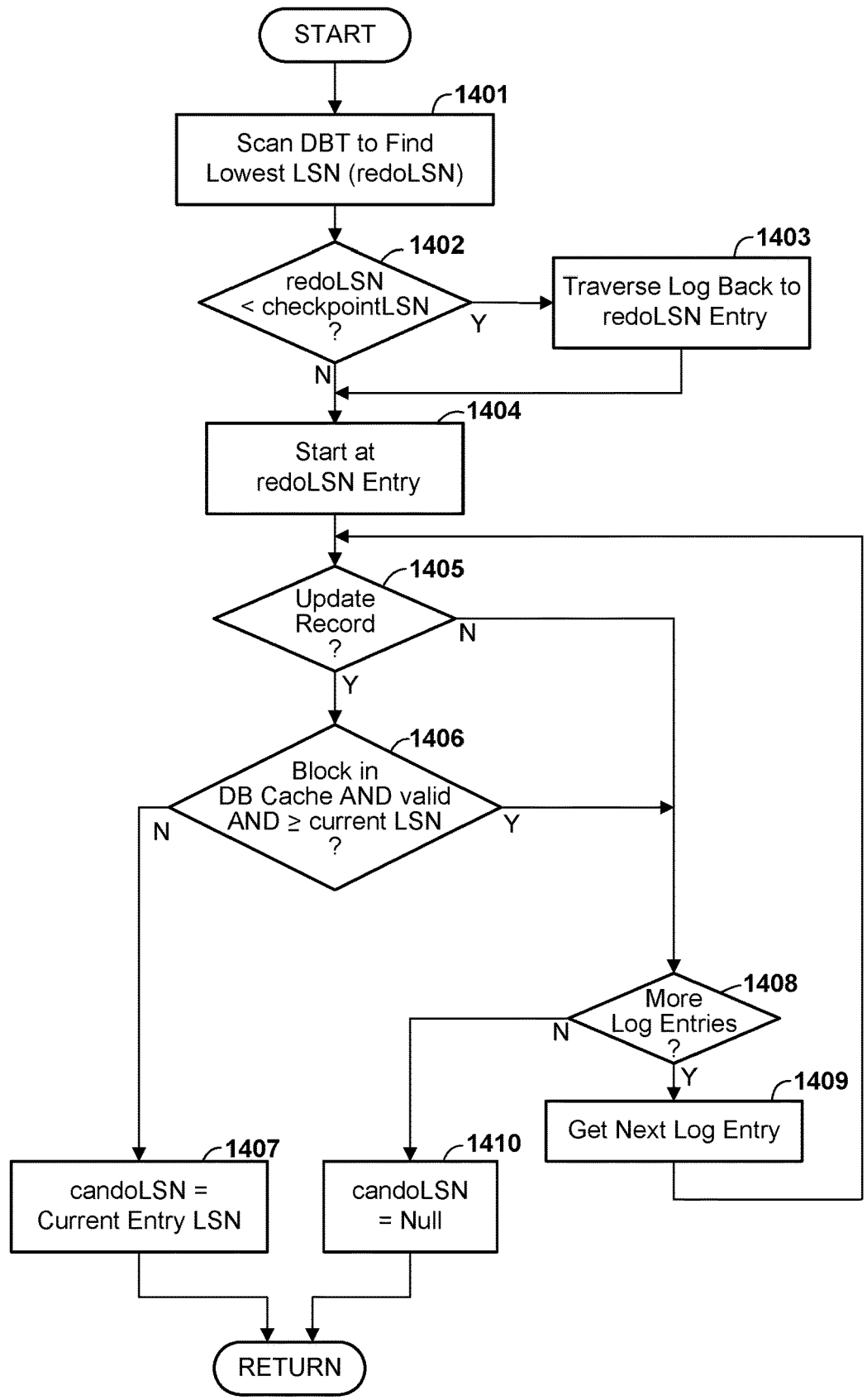
FIG. 14 is a flow diagram illustrating in greater detail a process of determining a candoLSN, in accordance with one or more preferred embodiments.

FIG. 14 is a flow diagram illustrating in greater detail a process of determining a candoLSN after the DBT and TT have been reconstructed, in accordance with one or more preferred embodiments.

Referring to FIG. 14, the lowest LSN in the DBT is found (box 1401). This could be accomplished by scanning all the entries in the DBT to find the entry having the lowest LSN, or alternatively, might have been done as part of the first stage when the DBT is populated with data. The lowest LSN in the DBT is the redoLSN.

If the redoLSN is less than the checkpointLSN (the 'Y' branch from box 1402), then the log is traversed back to the log entry corresponding to the redoLSN (box 1403). If the redoLSN is not less than the checkpointLSN, then it is not necessary to perform this action, since the log entries from the checkpointLSN forward have already been read into memory.

The log entries are then examined in turn going forward, starting with the redoLSN entry (box 1404). If the current log entry being examined is an update to a database record (the 'Y' branch from box 1405), then a determination is made whether the block of database data which is affected by the update is in the database cache 823, is valid, and its LSN is equal to or greater than the LSN of the current log entry (box 1406). Validity of the database block is verified by verifying the checksum stored with the block. If a valid block is not in database cache 823, or if it is in the cache but contains an LSN which is lower than the LSN of the current log entry being examined, then the 'N' branch is taken from box 1406), and the candoLSN is set equal to the LSN of the current log entry (box 1407), and the process returns from the second stage. The candoLSN will be the starting point from which selective entries in the log will have to be redone by reading the corresponding block from storage and updating it, as described further herein.

If the current log entry is not an update to a database record (the 'N' branch from box 1405), or it is an update which is already in the database cache (the 'Y' branch from box 1406), then nothing further needs to be done with the current log entry. If there are additional entries in the log (the 'Y' branch from block 1408), the next log entry is selected as the current log entry (box 1409), and the process loops back to box 1405 to examine the current log entry. If, at box 1408, there are no more log entries going forward, then the entire log has been examined without finding any log entries that need to be redone. Typically, this means that all the updates since the last checkpoint are already in the database cache 823 copied from the contents of cache 723 before failure of the primary database server. In this case, the candoLSN is set to zero, null, or some other special value to indicate that redo of log entries is complete (box 1410), and the second stage returns.

Figure 15:
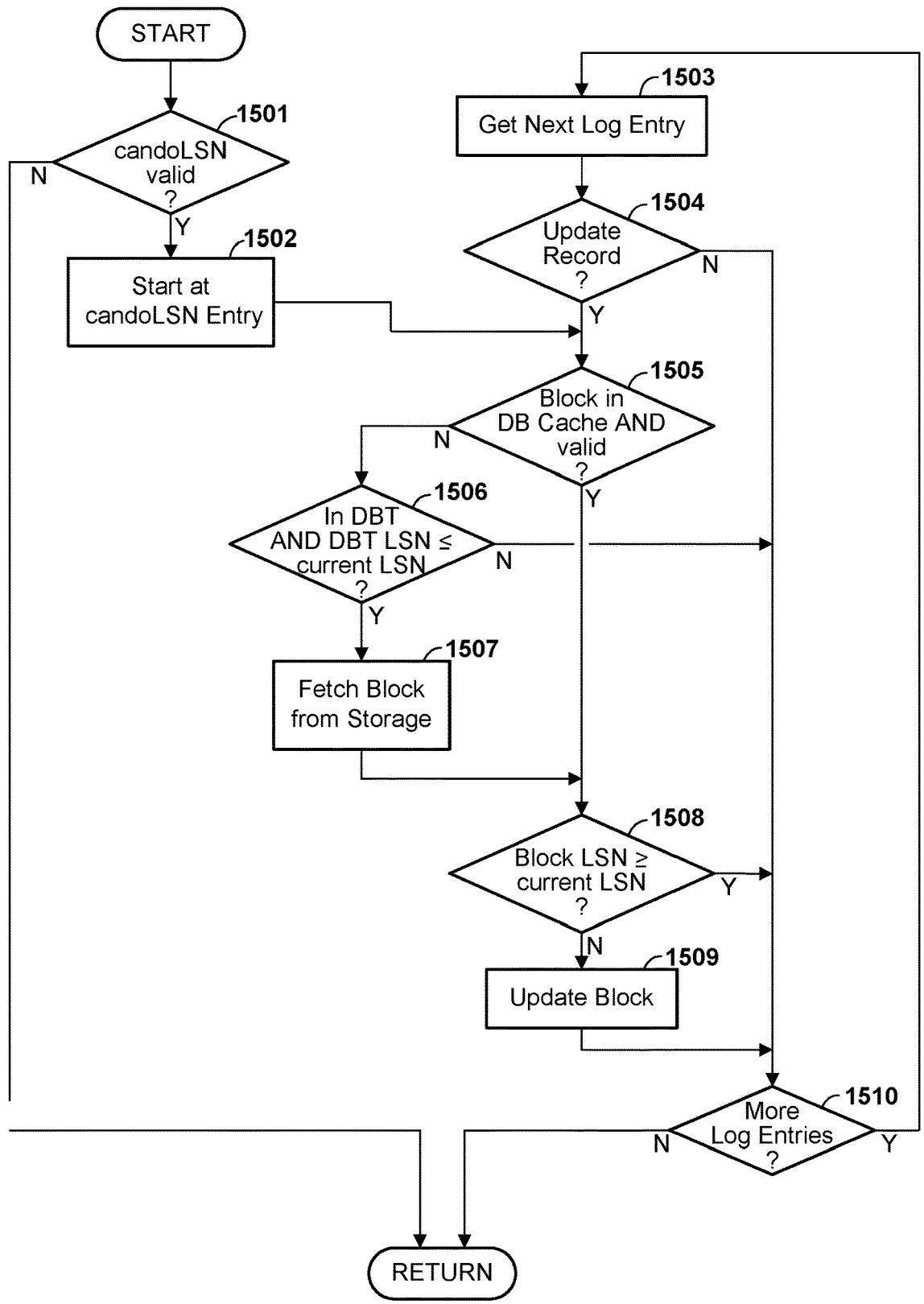
FIG. 15 is a flow diagram illustrating in greater detail a process of applying changes from the database log to selective blocks in the database from the redo LSN to the cando LSN, in accordance with one or more preferred embodiments.

FIG. 15 is a flow diagram illustrating in greater detail a process of applying changes from database log 323 to selective blocks in the database ("redo") from the candoLSN forward, in accordance with one or more preferred embodiments.

Referring to FIG. 15, if the candoLSN is a null or other invalid value, the 'N' branch is taken from box 1501 and the redo process returns (in this case, all blocks are already current, and no further redo actions are required). If the candoLSN is a valid value, the 'Y' branch is taken from block 1502, and the current log entry is initialized at the log entry of the candoLSN (box 1502).

The redo process steps successively through each entry in the log from the candoLSN entry forward, shown in FIG. 15 as boxes 1503-1510 However, for the initial entry (corresponding to the candoLSN), boxes 1503 and 1504 are skipped, as illustrated. At box 1503, a next log entry is selected as the current log entry. If the current log entry is other than an update to a database record, the 'N' branch is taken from block 1504 to box 1510, and no further examination of the current log entry is needed.

If the current log entry caused an update (change of data) to a database block (the 'Y' branch from box 1504), a determination is made whether the database block affected by the current log entry exists in database cache 823, and is valid (box 1505). Validity is ascertained by verifying the checksum of the block data. If the corresponding block does not exist in the cache or is not valid (the 'N' branch from block 1505), a determination is made whether an entry for the corresponding block exists in DBT 822 and contains an LSN which is less than or equal to the LSN of the current log entry (box 1506). If no entry for the updated block exists in the DBT, or if an entry exists in the DBT but contains an LSN which is higher than that of the current log entry, then the change made by the current log entry has already been written to storage. In this case, it is unnecessary to retrieve the block from storage and apply updates, and the 'N' branch is taken from box 1506 to box 1510, and no further examination of the current log entry is needed.

If there is a DBT entry for the block updated by the current log entry, and the LSN in the DBT is less than or equal to that of the current log entry (the 'Y' branch from box 1506), then the change made by the current log entry must be applied to the block. Since it has already been determined at box 1505 that the block is not in database cache 823, the block is fetched from storage into database cache 823 (box 1507).

After the block is fetched from storage at box 1507, or if a valid block is already in database cache 823 (the 'Y' branch from box 1505), a determination is made whether the LSN of the block is greater than or equal to the LSN of the current log entry (box 1508). If so, the update has already been applied to the block, and the 'Y' branch is taken from box 1508 to box 1510. If not, the 'N' branch is taken from box 1508, and the update action recorded in the current log entry is applied to the block in the database cache (box 1509).

If there are any more log entries to examine going forward, the 'Y' branch is taken from box 1510, and a next log entry is selected for examination at box 1503. When all log entries have been examined, the 'N' branch is taken from box 1510, and the redo process returns.

Figure 16:
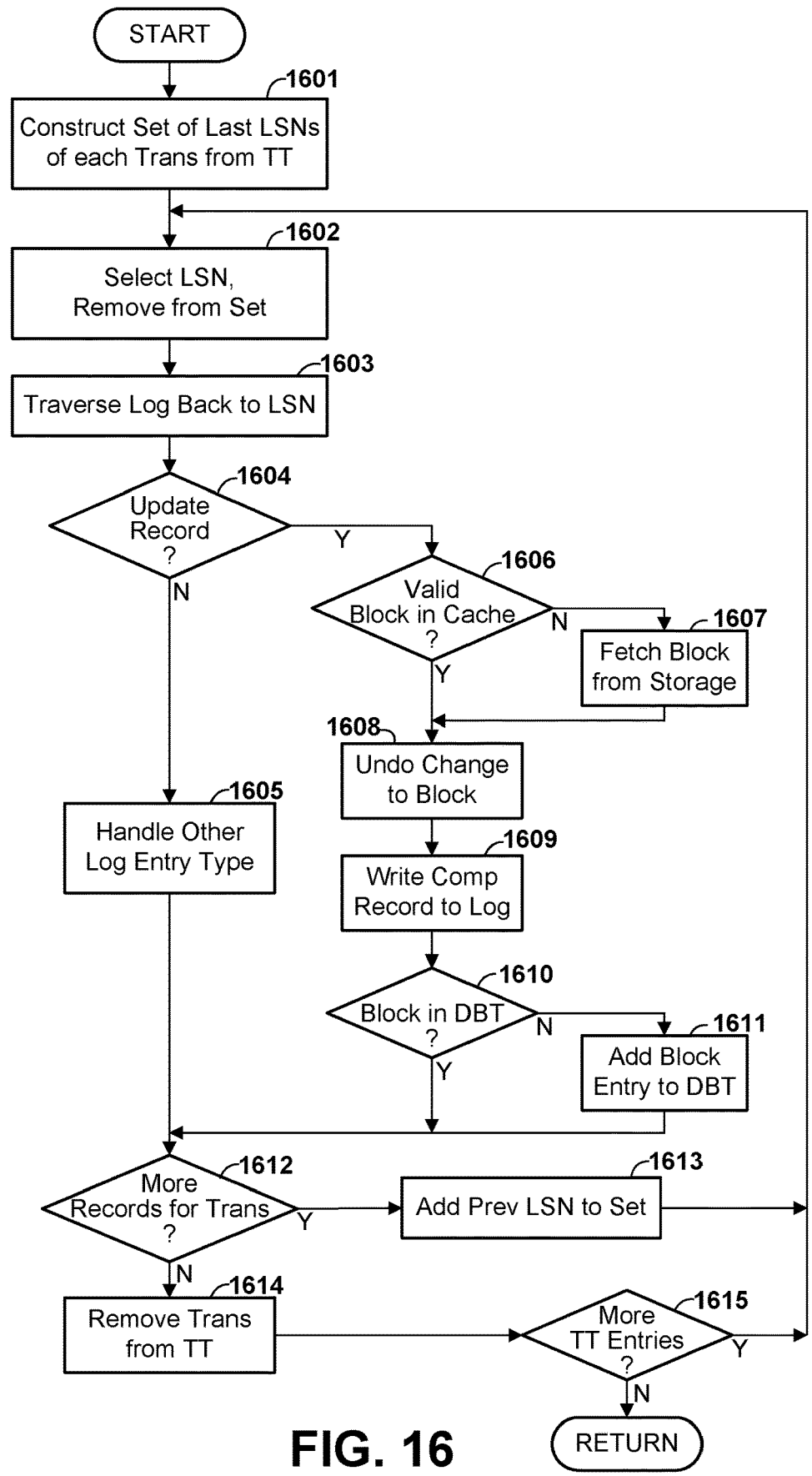
FIG. 16 is a flow diagram illustrating in greater detail a process of undoing selective changes to the database from incomplete transactions, in accordance with one or more preferred embodiments.

FIG. 16 is a flow diagram illustrating in greater detail a process of undoing selective changes to the database from incomplete transactions, in accordance with one or more preferred embodiments.

Referring to FIG. 16, a set of last LSN's from each incomplete transaction is extracted from the TT 821 (box 1601). I.e., each entry in TT 821 includes the LSN of the last (most recent) log entry for the corresponding incomplete transaction. The set of all these LSNs form a starting point for undoing incomplete transactions.

An LSN is selected from this set as the current LSN, and removed from the set (box 1602). Since the log will be traversed backward, this is preferably the highest LSN, although other methods could be used. The log is then traversed back to the current LSN (box 1603). The log entries may already be in memory as a result of previous recovery actions, but to the extent they are not, they are read in from storage.

If the log entry of the current LSN is an update record, the 'Y' branch is taken from box 1604. In this case, if the log entry updates a record which is already in a block 824 in database cache 823, and that block is verified as valid (using its checksum), the 'Y' branch is taken from box 1606, by-passing box 1607. If not, the corresponding block is fetched from storage (box 1607).

Any changes made by the current log entry are then reversed in the block in the database cache 823 (box 1608). A new compensation log entry (with a new LSN) is written to the log to record the fact that a previous update was undone (box 1609). This will cause the new LSN of the compensation record to be written to the corresponding block 824 in database cache 823. If an entry for the affected block does not exist in DBT 822, the 'N' branch is taken from box 1610, and a new entry is added to the DBT for the affected block, the new entry having the LSN of the compensation record (box 1611). If an entry for the affected block already exists in the DBT, the 'Y' branch is taken from box 1610, by-passing box 1611. The process then proceeds to box 1612.

If, at box 1604, the current log entry is something other than an entry recording an update to a database record, the 'N' branch is taken from box 1604, and the entry is handled as appropriate to its log entry type (box 1605). Depending on the type of entry, this may involve taking no action.

Each log entry which is associated with a particular transaction contains an LSN or other pointer to the most recent previous log entry for that same transaction, or a null or other special value if there is no previous entry. This value is examined to determine whether a previous entry exists (box 1612). If so, the 'Y' branch is taken from box 1612, the previous LSN is added to the set of LSNs to be undone (box 1613), and the process loops back to box 1602 to select a next LSN. If the previous LSN value indicates there is no previous LSN (the 'N' branch from box 1612), then all changes made by the transaction of which the current log entry is a part have been undone. In this case, the transaction is removed from TT 821 (box 1614). If, after removal, there are still entries in the TT, the 'Y' branch is taken from box 1615, and a next LSN is selected from the set at box 1602. If no more entries remain in the TT (the 'N' branch from box 1615), then all incomplete transactions have been undone, and the undo process returns.

After recovery is complete, the secondary database server can assume the role of a primary database server as described earlier, accessing the database on behalf of clients 105. Preferably, another node within cluster 101 (e.g., another partition within one of systems 102 within cluster 101) will then assume the role of the secondary database server. This new secondary database server can be allocated and initialized while the original secondary database server is performing recovery of the database.

Other Variations

Although a series of steps has been described above as one or more preferred and/or alternate embodiments, it will be appreciated that many variations of processes for monitoring and determining volatility of a database table and using database table volatility attributes to manage a database are possible. In particular, some steps may be performed in a different order, different data structures may be used, and/or different hardware or software resources may be employed to perform functions described herein. Furthermore, although certain formulae and variations thereof have been disclosed herein for determining volatility and taking certain actions based on volatility of database table data, it will be appreciated that these formulae and variations thereof are only some of the possible embodiments of a system which takes certain actions to maintain a database based on volatility of database table data, and that other formulae involving the same or different inputs could alternatively be used.

In the one or more preferred embodiments described herein, the primary database server and secondary database server are different respective nodes of a cluster implemented as respective logical partitions of different respective computer systems. However, it will be understood that certain variations in the computing environment are possible within the scope of the present invention. For example, the primary and secondary servers may be stand-alone devices which are not logically partitioned. Additionally, although a cluster environment is illustrated and described, a primary and secondary database server could be part of any cooperative computing environment, and might be simply a pair of devices which access a database on behalf of clients. Additionally, although the primary server has been described herein as the only server accessing the database during normal operation, a clustered or cooperative computing environment could contain multiple servers accessing a shared database. In such a case, different servers might perform different functions or be responsible for different data, e.g., one or more separate servers could be responsible for maintaining metadata, without altering data in database tables.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. Examples of a computer readable storage medium are illustrated in FIG. 2 as system memory 202 and data storage devices 225-227. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Unless inconsistent with the invention or otherwise qualified herein, computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A method for operating a computerized database, comprising:
    operating a first database server to perform a plurality of accesses to a shared database on behalf of respective clients, said shared database being recorded on a shared database storage, wherein at least some of said plurality of accesses perform updates to data in said shared database, and wherein updates to said shared database are logged in a sequential database log;
    concurrently with operating said first database server to perform a plurality of accesses to said shared database, copying data from a database cache in said first database server to a corresponding database cache in a second database server, said second database server acting as a standby database server;
    responsive to detecting a failure of said first database server, said failure including loss of access to data in the database cache in said first database server expressing one or more database transactions not yet written to said shared database storage, recovering the database to a consistent state in said second database server by: (a) using said sequential database log to verify selective data copied to the corresponding database cache in the second database server, and (b) using the selective verified data copied to the corresponding database cache in said second database server to reconstruct one or more database transactions not yet written to said shared database storage, the consistent state including the reconstructed one or more database transactions not yet written to said shared database storage; and
    thereafter operating said second database server to perform a plurality of accesses to said shared database on behalf of respective clients.

2. The method for operating a computerized database of claim 1, wherein said recovering the database to a consistent state in said second database server comprises:
    determining, with said sequential database log, a set of database actions to recover;
    verifying each of a plurality of blocks of data in the database cache in said second database server;
    recovering a first subset of the set of database actions using the verified blocks of data in the database cache in said second database server; and
    reading data from said shared database storage to recover any actions of the set of database actions not contained in the first subset.

3. The method of operating a computerized database of claim 2,
    wherein said sequential database log comprises a plurality of checkpoint entries each associated with a respective checkpoint time and each containing a respective dirty block table associated with the respective checkpoint time of the respective checkpoint entry; and
    wherein said determining, with the sequential database log, a set of database actions to recover comprises traversing the sequential database log backwards to the most recently logged checkpoint entry of said plurality of checkpoint entries, extracting the respective dirty block table of the most recently logged checkpoint entry, and updating the extracted dirty block table using entries from said sequential database log which were logged after the most recently logged checkpoint entry.

4. The method of operating a computerized database of claim 2,
    wherein each block of said plurality of blocks of data contains a respective checksum; and
    wherein said verifying each of a plurality of blocks of data in the database cache in said second database server comprises computing a respective checksum of each respective block and comparing it to the respective checksum contained in the block.

5. The method of operating a computerized database of claim 2, wherein said recovering the database to a consistent state further comprises:
    determining, with the sequential database log, a set of database actions to undo;
    undoing a first subset of the set of database actions to undo using the verified blocks of data in the database cache in said second database server; and
    reading data from said shared database storage to undo any actions of the set of database actions to undo not contained in the first subset of the set of database actions to undo.

6. The method of operating a computerized database of claim 1, wherein the first database server and the second database server are respective nodes of a computer system cluster coupled to at least one network.

7. The method of operating a computerized database of claim 1, wherein the first database server and the second database server are implemented as respective logical partitions of respective separate physical digital computing devices.

8. The method of operating a computerized database of claim 1, wherein said copying data from a database cache in said first database server to a corresponding database cache in a second database server is performed by a data mirroring function in one of: (a) a hypervisor which enforces logical partitioning of a first digital computing device, the first database server being implemented as a logical partition of the first digital computing device, or (b) an operating system for a first digital computing device.

9. A method of operating a computerized database, comprising:
 operating a first database server to perform a plurality of accesses to a shared database on behalf of respective clients, wherein at least some of said plurality of accesses perform updates to data in said shared database, and wherein updates to said shared database are logged in a sequential database log;
 concurrently with operating said first database server to perform a plurality of accesses to said shared database, copying data from a database cache in said first database server to a corresponding database cache in a second database server, said second database server acting as a standby database server;
 responsive to detecting a failure of said first database server, recovering the database to a consistent state in said second database server using said sequential database log and said data copied to the corresponding database cache in said second database server;
 thereafter operating said second database server to perform a plurality of accesses to said shared database on behalf of respective clients;
 wherein said database cache in said first database server occupies a first range of virtual address space in said first database server, and said corresponding database cache in said second database server occupies a second range of virtual address space in said second database server, said first and second ranges being identical; and
 wherein said concurrently with operating said first database server to perform a plurality of accesses to said shared database, copying data from a database cache in said first database server to a corresponding database cache in a second database server, comprises copying each item of data from a respective virtual address in the database cache in said first database server to an identical respective virtual address in the corresponding database cache in said second database server.

10. A method for operating a standby database server, comprising:
 receiving an indication that a failure has occurred in a first database server for which said standby database server acts as a standby, the first database server accessing a shared database recorded on a shared database storage on behalf of respective clients to perform updates to data in said shared database, the updates being logged to a sequential database log, wherein said failure includes loss of access to data in a database cache in said first database server, said database cache expressing one or more database transactions not yet written to said shared database storage;
 responsive to receiving an indication that a failure has occurred in said first database server, accessing a database cache in said standby server, said database cache in said standby server containing data copied from said database cache in said first database server concurrently with operating said first database server before failure occurred in said first database server;
 responsive to receiving an indication that a failure has occurred in said first database server, recovering the database to a consistent state in said standby database server by: (a) using said sequential database log to verify selective data from said database cache in said standby database server, and (b) using the selective verified data from said database cache in said standby database server to reconstruct one or more of the database transactions not yet written to said shared database storage, the consistent state including the reconstructed one or more of the database transactions not yet written to said shared database storage; and
 thereafter operating said standby database server to perform a plurality of accesses to said shared database on behalf of respective clients.

11. The method for operating a standby database server of claim 10, wherein said recovering the database to a consistent state in said standby database server comprises:
 determining, with said sequential database log, a set of database actions to recover;
 verifying each of a plurality of blocks of data in the database cache in said standby database server;
 recovering a first subset of the set of database actions using the verified blocks of data in the database cache in said standby database server; and
 reading data from said shared database storage to recover any actions of the set of database actions not contained in the first subset.

12. The method for operating a standby database server of claim 11,
 wherein said sequential database log comprises a plurality of checkpoint entries each associated with a respective checkpoint time and each containing a respective dirty block table associated with the respective checkpoint time of the respective checkpoint entry; and
 wherein said determining, with the sequential database log, a set of database actions to recover comprises traversing the sequential database log backwards to the most recently logged checkpoint entry of said plurality of checkpoint entries, extracting the respective dirty block table of the most recently logged checkpoint entry, and updating the extracted dirty block table using entries from said sequential database log which were logged after the most recently logged checkpoint entry.

13. The method for operating a standby database server of claim 11,
 wherein each block of said plurality of blocks of data contains a respective checksum; and
 wherein said verifying each of a plurality of blocks of data in the database cache in said standby database server comprises computing a respective checksum of each respective block and comparing it to the respective checksum contained in the block.

14. The method for operating a standby database server of claim 11, wherein said recovering the database to a consistent state further comprises:
 determining, with the sequential database log, a set of database actions to undo;

undoing a first subset of the set of database actions to undo using the verified blocks of data in the database cache in said standby database server; and reading data from said shared database storage to undo any actions of the set of database actions to undo not contained in the first subset of the set of database actions to undo.

15. The method for operating a standby database server of claim 10, wherein said database cache in said first database server occupies a first range of virtual address space in said first database server, and said database cache in said standby database server occupies a second range of virtual address space in said standby database server, said first and second ranges being identical; and wherein said database cache in said standby server contains data copied from said database cache in said first database server concurrently with operating said first database server before failure occurred in said first database server by copying each item of data from a respective virtual address in the database cache in said first database server to an identical respective virtual address in the database cache in said second database server.

16. The method for operating a standby database server of claim 10, wherein the first database server and the standby database server are respective nodes of a computer system cluster coupled to at least one network.

17. The method for operating a standby database server of claim 10, wherein the first database server and the standby database server are implemented as respective logical partitions of respective separate physical digital computing devices.

* * * * *